United States Patent
Chaudhary et al.

(10) Patent No.: US 12,077,618 B2
(45) Date of Patent: Sep. 3, 2024

(54) MOISTURE CROSSLINKABLE COPOLYMERS OF ETHYLENE AND HYDROLYSABLE SILANE

(71) Applicant: Dow Global Technologies LLC, Midland, MI (US)

(72) Inventors: Bharat I. Chaudhary, Princeton, NJ (US); Bruce Michael Hasch, Pearland, TX (US); Sarat Munjal, Lake Jackson, TX (US); Christopher Eddy, Lake Jackson, TX (US); Kevin Paul Rogers, Jamison, PA (US); Rajesh P. Paradkar, Lake Jackson, TX (US); Arkady Krasovskiy, Lake Jackson, TX (US); Manish Talreja, Collegeville, PA (US); Saurav S. Sengupta, Collegeville, PA (US)

(73) Assignee: Dow Global Technologies LLC, Midland, MI (US)

( * ) Notice: Subject to any disclaimer, the term of this patent is extended or adjusted under 35 U.S.C. 154(b) by 483 days.

(21) Appl. No.: 17/291,408

(22) PCT Filed: Nov. 11, 2019

(86) PCT No.: PCT/US2019/060724
§ 371 (c)(1),
(2) Date: May 5, 2021

(87) PCT Pub. No.: WO2020/102079
PCT Pub. Date: May 22, 2020

(65) Prior Publication Data
US 2021/0363277 A1 Nov. 25, 2021

Related U.S. Application Data

(60) Provisional application No. 62/758,739, filed on Nov. 12, 2018.

(51) Int. Cl.
C08F 210/02 (2006.01)
C08L 23/08 (2006.01)
H01B 3/44 (2006.01)

(52) U.S. Cl.
CPC ........ *C08F 210/02* (2013.01); *C08L 23/0892* (2013.01); *H01B 3/441* (2013.01); *C08F 2800/20* (2013.01); *C08F 2810/20* (2013.01); *C08F 2810/50* (2013.01); *C08L 2312/08* (2013.01)

(58) Field of Classification Search
None
See application file for complete search history.

(56) References Cited

U.S. PATENT DOCUMENTS

| | | |
|---|---|---|
| 4,144,202 A | 3/1979 | Ashcraft et al. |
| 4,297,310 A | 10/1981 | Akutsu et al. |
| 4,397,981 A | 8/1983 | Doi et al. |
| 4,413,066 A | 11/1983 | Isaka et al. |
| 4,446,283 A | 5/1984 | Doi et al. |
| 4,689,369 A | 8/1987 | Ishino et al. |
| 4,983,675 A | 1/1991 | Ishino et al. |
| 5,246,783 A | 9/1993 | Spenadel et al. |
| 5,266,627 A | 11/1993 | Meverden et al. |
| 5,272,236 A | 12/1993 | Lai et al. |
| 5,278,272 A | 1/1994 | Lai et al. |
| 5,986,028 A | 11/1999 | Lai et al. |
| 6,496,629 B2 | 12/2002 | Ma et al. |
| 6,714,707 B2 | 3/2004 | Rossi et al. |
| 7,355,089 B2 | 4/2008 | Chang et al. |
| 7,504,347 B2 | 3/2009 | Poon et al. |
| 7,514,517 B2 | 4/2009 | Hoenig et al. |
| 7,524,911 B2 | 4/2009 | Karjala et al. |
| 7,579,408 B2 | 8/2009 | Walton et al. |
| 7,582,716 B2 | 9/2009 | Liang et al. |
| 7,834,115 B2 | 11/2010 | Johansson et al. |

(Continued)

FOREIGN PATENT DOCUMENTS

| | | |
|---|---|---|
| CN | 106661288 A | 5/2017 |
| JP | S63-135505 A | 6/1987 |

(Continued)

OTHER PUBLICATIONS

Busico et al., "1H NMR Analysis of Chain Unsaturations in Ethene/1-Octene Copolymers Prepared with Metallocene Catalysts at High Temperature", Macromolecules, 2005, 38, 6988.
International Search Report and Written Opinion pertaining to PCT/US2019/060724, dated Apr. 29, 2020.
Ishino et al., "Molecular Structure and Electric Breakdown of Ethylene/Silane Copolymers", Japanese Journal of Applied Physics, 1991, 30, 720-726.
Williams, The Construction of A Polyethylene Calibration Curve For el Permeation CHromotagraphy Using Polystyrene Fractions, Polymer Letters, 1968, pp. 621-624, vol. 6.
Communication 161/162 pertaining to Application No. 19863149.5 dated Jun. 22, 2021.

(Continued)

*Primary Examiner* — Shawn Mckinnon
(74) *Attorney, Agent, or Firm* — Dinsmore & Shohl LLP

(57) ABSTRACT

A copolymer of ethylene and hydrolysable silane includes from 0.1 wt % to 5.0 wt % hydrolysable silane groups and has a Mz(abs)/Mw(abs) of less than or equal to 9.5; a ratio of Mz(abs)/Mw(abs) to polydispersity of less than or equal to 1.5; a polydispersity of 6.6 or greater; a Density×Polydispersity of 6.0 or greater; or an Amorphous Content at Room Temperature×Polydispersity of 360 or greater. Methods for forming a moisture-crosslinkable polymer composition include forming a copolymer of ethylene and hydrolysable silane at a polymerization temperature of greater than or equal to 180° C. to less than or equal to 400° C. at a pressure from 5,000 psi to 50,000 psi; and adding a silanol condensation catalyst to the copolymer of ethylene and hydrolysable silane.

14 Claims, No Drawings

(56) References Cited

U.S. PATENT DOCUMENTS

| | | | |
|---|---|---|---|
| 8,722,827 | B2 | 5/2014 | Carlsson et al. |
| 9,133,331 | B2 | 9/2015 | Dahlen et al. |
| 9,221,934 | B2 | 12/2015 | Feichtner et al. |
| 2003/0096904 | A1 | 5/2003 | Hakuta et al. |
| 2007/0023735 | A1* | 2/2007 | Biscoglio .............. C08K 11/00 524/157 |
| 2014/0127505 | A1 | 5/2014 | Dahlen et al. |
| 2017/0240672 | A1* | 8/2017 | Costa ................. H01L 31/0481 |

FOREIGN PATENT DOCUMENTS

| | | |
|---|---|---|
| JP | H05-170828 A | 7/1993 |
| WO | 0168723 A2 | 9/2001 |
| WO | 0214379 A1 | 2/2002 |
| WO | 2016041922 A1 | 3/2016 |
| WO | 2016204949 A1 | 12/2016 |

OTHER PUBLICATIONS

Chinese Office Action and Search Report dated Nov. 3, 2022, pertaining to CN Patent Application No. 201980069375.4, 16 pgs.
Japanese Office Action dated Nov. 28, 2023, pertaining to JP Patent Application No. 2021-521348, 6 pgs.

* cited by examiner

MOISTURE CROSSLINKABLE COPOLYMERS OF ETHYLENE AND HYDROLYSABLE SILANE

CROSS-REFERENCE TO RELATED APPLICATIONS

This application is a National Stage Entry under 35 U.S.C. § 371 of International Patent Application No. PCT/US2019/060724, filed Nov. 11, 2019, which claims priority to U.S. Provisional Patent Application No. 62/758,739 filed on Nov. 12, 2018, the entire disclosures of which are hereby incorporated by reference.

BACKGROUND

Field

The present specification generally relates to a fast moisture crosslinking copolymer of ethylene and hydrolysable silane. In particular, this specification relates to fast moisture crosslinking reactor copolymers of ethylene and hydrolysable silane. This specification particularly relates to fast moisture crosslinking reactor copolymers of ethylene and hydrolysable silane that are manufactured without use of a chain transfer agent.

Technical Background

Ethylene silane copolymers that are made in tubular reactors are routinely used in moisture crosslinkable polymer compositions (usually in combination with silanol condensation catalysts) to fabricate articles such as low voltage cable constructions. In certain applications, the polymer compositions serve as jackets or electrical insulation. Some moisture crosslinkable ethylene silane copolymers include "autoclave-made" ethylene silane copolymers. A chain transfer agent (such as propylene) is known to be used in making ethylene silane copolymers on tubular and/or autoclave reactors. Autoclave-made copolymers are generally not practiced commercially to make moisture-crosslinkable polymer compositions. Alternative moisture crosslinkable copolymers and methods for making such moisture crosslinkable copolymers are desired, especially to yield faster crosslinking.

SUMMARY

According to one embodiment of the present disclosure, a copolymer of ethylene and hydrolysable silane comprises one or both of from 0.1 wt % to 5.0 wt % hydrolysable silane groups and from 0.02 mol % to 1.00 mol % hydrolysable silane groups and has at least one of the following properties: a Mz(abs)/Mw(abs) of less than or equal to 9.5; a ratio of "Mz(abs)/Mw(abs)" to polydispersity of less than or equal to 1.5; a polydispersity of 6.6 or greater; a "Density×Polydispersity" of 6.0 or greater; or an "Amorphous Content at Room Temperature×Polydispersity" of 360 or greater.

Embodiments of the present disclosure include a moisture-crosslinkable polymeric composition comprising: a copolymer of ethylene and hydrolysable silane that comprises one or both of from 0.1 wt % to 5.0 wt % hydrolysable silane groups and from 0.02 mol % to 1.00 mol % hydrolysable silane groups and has at least one of the following properties: a Mz(abs)/Mw(abs) of less than or equal to 9.5; a ratio of "Mz(abs)/Mw(abs)" to polydispersity of less than or equal to 1.5; a polydispersity of 6.6 or greater; a "Density×Polydispersity" of 6.0 or greater; or an "Amorphous Content at Room Temperature×Polydispersity" of 360 or greater; and a silanol condensation catalyst.

In an embodiment, the moisture-crosslinkable polymeric composition has a hot creep, measured at 0.2 MPa and 150° C. or 200° C. on extruded tape with a thickness of 50 mil (1.270 mm) to 80 mil (2.032 mm), of less than or equal to 100% within 15 days or less than or equal to 80% within 23 days, where the tape made of the moisture-crosslinkable polymeric composition has been cured at 23° C. and 50% relative humidity.

According to one or more embodiments, the moisture-crosslinkable polymeric composition has a hot creep, measured at 0.2 MPa and 150° C. or 200° C. on extruded tape with a thickness of 30 mil (0.762 mm) to 80 mil (2.032 mm), of less than or equal to 175% after curing the tape for 4 hours to 20 hours in a 90° C. water bath.

Embodiments disclosed herein include a cable comprising: a conductor; and a jacket or insulation annularly encompassing the conductor, wherein the jacket or insulation comprises a moisture-crosslinkable polymeric composition comprising: a copolymer of ethylene and hydrolysable silane that comprises one or both of from 0.1 wt % to 5.0 wt % hydrolysable silane groups and from 0.02 mol % to 1.00 mol % hydrolysable silane groups and has at least one of the following properties: a Mz(abs)/Mw(abs) of less than or equal to 9.5; a ratio of "Mz(abs)/Mw(abs)" to polydispersity of less than or equal to 1.5; a polydispersity of 6.6 or greater; a "Density×Polydispersity" of 6.0 or greater; or an "Amorphous Content at Room Temperature×Polydispersity" of 360 or greater; and a silanol condensation catalyst.

Embodiments include a method for forming a moisture-crosslinkable polymer composition comprising: forming a copolymer of ethylene and hydrolysable silane at a polymerization temperature of greater than or equal to 180° C. to less than or equal to 400° C. at a pressure from 5,000 psi (34.5 MPa) to 50,000 psi (344.7 MPa) with or without a chain transfer agent; and adding a silanol condensation catalyst to the copolymer of ethylene and hydrolysable silane groups.

Additional features and advantages will be set forth in the detailed description which follows, and in part will be readily apparent to those skilled in the art from that description or recognized by practicing the embodiments described herein, including the detailed description which follows and the claims.

It is to be understood that both the foregoing general description and the following detailed description describe various embodiments and are intended to provide an overview or framework for understanding the nature and character of the claimed subject matter.

DETAILED DESCRIPTION

Reference will now be made in detail to embodiments of copolymers of ethylene and hydrolysable silane, methods for making such copolymers, moisture-crosslinkable polymeric compositions comprising such copolymers, and products including such moisture crosslinkable compositions. Below are definitions of terms that are used in this disclosure.

Definitions

The numerical ranges disclosed herein include all values from, and including, the lower and upper value, unless otherwise specified (such as by the use of "greater than", "less than," or the like. For ranges containing explicit values (e.g., 1 or 2; or 3 to 5; or 6; or 7), any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

"Composition" and like terms mean a mixture of materials which comprise the composition, as well as reaction products and decomposition products formed from the materials of the composition.

"Polymer" and like terms mean a macromolecular compound prepared by reacting (i.e., polymerizing) monomers of the same or different type. "Polymer" includes homopolymers and interpolymers. Trace amounts of impurities, for example, catalyst residues, may be incorporated into and/or within the polymer. The term also embraces all forms of copolymer, e.g., random, block, etc. Although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers are referred to has being based on "units" that are the polymerized form of a corresponding monomer.

"Interpolymer" means a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Polyolefin", "PO" and like terms mean a polymer derived from simple olefins. Many polyolefins are thermoplastic and for purposes of this disclosure, can include a rubber phase. Representative polyolefins include polyethylene, polypropylene, polybutene, polyisoprene and their various interpolymers.

"Ethylenic polymer", "ethylene-based polymer," "ethylene polymer," "polyethylene," "ethylene," and like terms mean a polymer that contains equal to or greater than 50 weight percent (wt %), or a majority amount, of polymerized ethylene based on the weight of the polymer, and, optionally, may comprise one or more polymerized comonomers. The generic term "ethylene-based polymer" thus includes ethylene homopolymer and ethylene interpolymer. Ethylene-based polymers include copolymers of ethylene and hydrolysable silanes.

A "conductor" is an element of elongated shape (wire, cable, optical fiber) for transferring energy at any voltage (DC, AC, or transient). The conductor is typically at least one metal wire or at least one metal cable (such as aluminum or copper), but may be optical fiber. The conductor may be a single cable or a plurality of cables bound together (i.e., a cable core, or a core).

A "sheath" is a generic term and when used in relation to cables, it includes insulation coverings or layers, protective jackets and the like.

A "wire" is a single strand of conductive metal, e.g., copper or aluminum, or a single strand of optical fiber.

A "cable" is at least one conductor, e.g., wire, optical fiber, etc., within a protective jacket or sheath. Typically, a cable is two or more wires or two or more optical fibers bound together in a common protective jacket or sheath. Combination cables may contain both electrical wires and optical fibers. The individual wires or fibers inside the jacket or sheath may be bare, covered or insulated. Typical cable designs are illustrated in U.S. Pat. Nos. 5,246,783; 6,496,629; and 6,714,707, each of which are incorporated herein by reference in their entirety.

"Crosslinkable," "curable" and like terms indicate that the polymer, before or after shaped into an article, is not cured or crosslinked and has not been subjected or exposed to treatment that has induced substantial crosslinking although the polymer comprises additive(s) or functionality which will cause, promote or enable substantial crosslinking upon subjection or exposure to such treatment (e.g., exposure to water).

"Moisture-crosslinkable polymeric composition" and like terms mean a composition that comprises a polymer that can be crosslinked upon exposure to humidity or water under appropriate temperature. In embodiments, one of the polymers in the composition has hydrolysable silane groups.

"Hydrolysable silane group" and like terms mean a silane group that will react with water. These include alkoxysilane groups on monomers or polymers that can hydrolyze to yield silanol groups, which in turn can condense to crosslink the monomers or polymers.

"Room temperature" and like terms mean 23° C.±2° C.

"Ambient conditions" and like terms mean room temperature and relative humidity" (ranging from 10% to 100%).

It should also be understood that as used herein hydrolysable silanes include hydrolysable silanes that can be copolymerized with ethylene, such as, olefinically-functional hydrolysable silanes, olefinically-unsaturated hydrolysable silanes, or alkenyl-functional hydrolysable silanes.

Copolymer of Ethylene and Hydrolysable Silane

Surprisingly, it was discovered that ethylene and hydrolysable silane copolymers having at least one of the following properties: a Mz(abs)/Mw(abs) of less than or equal to 9.5; a ratio of "Mz(abs)/Mw(abs)" to polydispersity of less than or equal to 1.5; a polydispersity of 6.6 or greater; a "Density×Polydispersity" of 6.0 or greater; or an "Amorphous Content at Room Temperature×Polydispersity" of 360 or greater crosslinked considerably faster at ambient conditions than those that did not meet this criteria. Non-limiting examples of copolymers of ethylene and hydrolysable silane having at least one of the following properties: a Mz(abs)/Mw(abs) of less than or equal to 9.5; a ratio of "Mz(abs)/Mw(abs)" to polydispersity of less than or equal to 1.5; a polydispersity of 6.6 or greater; a "Density×Polydispersity" of 6.0 or greater; or an "Amorphous Content at Room Temperature×Polydispersity" of 360 or greater have been made in an autoclave reactor at a polymerization temperature of 250° C. without employing a chain transfer agent. Moisture crosslinkable ethylene hydrolysable silane copolymers having at least one of the following properties: a Mz(abs)/Mw(abs) of less than or equal to 9.5; a ratio of "Mz(abs)/Mw(abs)" to polydispersity of less than or equal to 1.5; a polydispersity of 6.6 or greater; a "Density×Polydispersity" of 6.0 or greater; or an "Amorphous Content at Room Temperature×Polydispersity" of 360 or greater may exhibit molecular weight distributions that allow the ethylene hydrolysable silane copolymers to crosslink fast at ambient conditions (such as, for example, room temperature and relative humidity) in the presence of a silanol condensation catalyst.

Accordingly, in one embodiment, a copolymer of ethylene and hydrolysable silane comprises from 0.1 wt % to 5.0 wt % hydrolysable silane groups and has at least one of the following properties: a Mz(abs)/Mw(abs) of less than or equal to 9.5; a ratio of "Mz(abs)/Mw(abs)" to polydispersity of less than or equal to 1.5; a polydispersity of 6.6 or greater; a "Density×Polydispersity" of 6.0 or greater; or an "Amorphous Content at Room Temperature×Polydispersity" of 360 or greater. In some embodiments, the copolymer of ethylene and hydrolysable silane comprises from 0.2 wt % to 5.0 wt % hydrolysable silane groups, such as from 0.4 wt % to 5.0 wt % hydrolysable silane groups, from 0.6 wt % to 5.0 wt % hydrolysable silane groups, from 0.8 wt % to 5.0 wt % hydrolysable silane groups, from 1.0 wt % to 5.0 wt % hydrolysable silane groups, from 1.2 wt % to 5.0 wt % hydrolysable silane groups, from 1.4 wt % to 5.0 wt % hydrolysable silane groups, from 1.8 wt % to 5.0 wt % hydrolysable silane groups, from 2.0 wt % to 5.0 wt % hydrolysable silane groups, from 2.2 wt % to 5.0 wt % hydrolysable silane groups, from 2.4 wt % to 5.0 wt % hydrolysable silane groups, from 2.6 wt % to 5.0 wt % hydrolysable silane groups, from 2.8 wt % to 5.0 wt % hydrolysable silane groups, from 3.0 wt % to 5.0 wt % hydrolysable silane groups, from 3.0 wt % to 5.0 wt % hydrolysable silane groups, from 3.2 wt % to 5.0 wt % hydrolysable silane groups, from 3.4 wt % to 5.0 wt % hydrolysable silane groups, from 3.6 wt % to 5.0 wt % hydrolysable silane groups, from 3.8 wt % to 5.0 wt % hydrolysable silane groups, from 4.0 wt % to 5.0 wt % hydrolysable silane groups, from 4.2 wt % to 5.0 wt % hydrolysable silane groups, from 4.4 wt % to 5.0 wt % hydrolysable silane groups, from 4.6 wt % to 5.0 wt % hydrolysable silane groups, or from 4.8 wt % to 5.0 wt % hydrolysable silane groups. In some embodiments, the copolymer of ethylene and hydrolysable silane comprises from 0.1 wt % to 4.8 wt % hydrolysable silane groups, such as from 0.1 wt % to 4.6 wt % hydrolysable silane groups, from 0.1 wt % to 4.4 wt % hydrolysable silane groups, from 0.1 wt % to 4.2 wt % hydrolysable silane groups, from 0.1 wt % to 4.0 wt % hydrolysable silane groups, from 0.1 wt % to 3.8 wt % hydrolysable silane groups, from 0.1 wt % to 3.6 wt % hydrolysable silane groups, from 0.1 wt % to 3.4 wt % hydrolysable silane groups, from 0.1 wt % to 3.2 wt % hydrolysable silane groups, from 0.1 wt % to 3.0 wt % hydrolysable silane groups, from 0.1 wt % to 2.8 wt % hydrolysable silane groups, from 0.1 wt % to 2.6 wt % hydrolysable silane groups, from 0.1 wt % to 2.4 wt % hydrolysable silane groups, from 0.1 wt % to 2.2 wt % hydrolysable silane groups, from 0.1 wt % to 2.0 wt % hydrolysable silane groups, from 0.1 wt % to 1.8 wt % hydrolysable silane groups, from 0.1 wt % to 1.6 wt % hydrolysable silane groups, from 0.1 wt % to 1.4 wt % hydrolysable silane groups, from 0.1 wt % to 1.2 wt % hydrolysable silane groups, from 0.1 wt % to 1.0 wt % hydrolysable silane groups, from 0.1 wt % to 0.8 wt % hydrolysable silane groups, from 0.1 wt % to 0.6 wt % hydrolysable silane groups, from 0.1 wt % to 0.4 wt % hydrolysable silane groups, or from 0.1 wt % to 0.2 wt % hydrolysable silane groups. In some embodiments, the copolymer of ethylene and hydrolysable silane comprises from 0.9 wt % to 3.5 wt % hydrolysable silane groups, such as from 1.1 wt % to 3.0 wt % hydrolysable silane groups, or from 1.3 wt % to 2.5 wt % hydrolysable silane groups.

In some embodiments, the copolymer of ethylene and hydrolysable silane comprises from 0.02 mol % to 1.00 mol % hydrolysable silane groups, such as from 0.17 mol % to 0.68 mol % hydrolysable silane groups, or from 0.23 mol % to 0.37 mol % hydrolysable silane groups, or from 0.25 mol % to 0.38 mol % hydrolysable silane groups, or from 0.38 mol % to 1.00 mol % hydrolysable silane groups, or from 0.38 mol % to 0.68 mol % hydrolysable silane groups.

In some embodiments, the copolymer of ethylene and hydrolysable silane comprises from 0.01 mol/kg to 0.34 mol/kg hydrolysable silane groups, such as from 0.06 mol/kg to 0.24 mol/kg hydrolysable silane groups, or from 0.08 mol/kg to 0.13 mol/kg hydrolysable silane groups, or from 0.09 mol/kg to 0.14 mol/kg hydrolysable silane groups, or from 0.14 mol/kg to 0.34 mol/kg hydrolysable silane groups, or from 0.14 mol/kg to 0.24 mol/kg hydrolysable silane groups.

In some embodiments, the long chain branch content (LCB; $C_6$ and higher per 1000 carbon atoms) is 2.9 or greater, or 3.0 or greater, or 3.1 or greater, or 3.2 or greater, or 3.3 or greater, or 3.4 or greater, or 3.5 or greater.

In some embodiments, the copolymer of ethylene and hydrolysable silane has a polydispersity of greater than 2.0, such as greater than 2.5, greater than 3.0, greater than 3.5, greater than 4.0, greater than 4.5, greater than 5.0, greater than 5.5, greater than 5.9, greater than 6.0, greater than 6.1, greater than 6.2, greater than 6.3, greater than 6.4, greater than 6.5, greater than 6.6, greater than 6.7, greater than 6.8, greater than 6.9, greater than 7.0, greater than 7.5, greater than 8.0, greater than 8.5, or greater than 9.0. In some embodiments, the maximum polydispersity is 15.0, 13.0, or 10.0. Accordingly, in some embodiments, the copolymer of ethylene and hydrolysable silane has a polydispersity from greater than 2.0 to 15.0, such as from greater than 3.0 to 15.0, greater than 4.0 to 15.0, from greater than 4.5 to 15.0, from greater than 5.0 to 15.0, from greater than 5.5 to 15.0, from greater than 6.0 to 15.0, from greater than 6.1 to 15.0, from greater than 6.2 to 15.0, from greater than 6.3 to 15.0, from greater than 6.4 to 15.0, from greater than 6.5 to 15.0, from greater than 6.6 to 15.0, from greater than 6.7 to 15.0, from greater than 6.8 to 15.0, from greater than 6.9 to 15.0, from greater than 7.0 to 15.0, from greater than 7.5 to 15.0, from greater than 8.0 to 15.0, from greater than 8.5 to 15.0, or from greater than 9.0 to 15.0.

In some embodiments, the copolymer of ethylene and hydrolysable silane has a Mz(abs)/Mw(abs) of less than or equal to 9.5, or less than or equal to 9.0, or less than or equal to 8.5, or less than or equal to 8.0, or less than or equal to 7.5, or less than or equal to 7.0, or less than or equal to 6.5, or less than or equal to 6.0, or less than or equal to 5.5, or less than or equal to 5.0.

In some embodiments, the copolymer of ethylene and hydrolysable silane has a ratio of "Mz(abs)/Mw(abs)" to polydispersity of less than or equal to 1.5, or less than or equal to 1.4, or less than or equal to 1.3, or less than or equal to 1.2, or less than or equal to 1.1, or less than or equal to 1.0, or less than or equal to 0.9, or less than or equal to 0.8, or less than or equal to 0.7, or less than or equal to 0.6.

According to embodiments, the copolymer of ethylene and hydrolysable silane has a melt index ($I_2$ in g/10 min) from 0.1 to 30, such as from 0.2 to 25, from 0.3 to 20, from 0.4 to 15.0, from 0.5 to 10.0, from 0.6 to 8.0, from 0.7 to 6.0, from 0.8 to 5.0, from 0.9 to 4.0, from 1.0 to 3.5, from 1.1 to 3.3, from 1.2 to 3.1, from 1.3 to 2.9, from 1.4 to 2.7, from 1.5 to 2.5, from 1.6 to 2.3, or from 1.7 to 2.1. In some embodiments, the copolymer of ethylene and hydrolysable silane has a I2 from 0.8 to 3.6, such as from 0.8 to 3.3, from 0.8 to 3.1, from 0.8 to 2.9, from 0.8 to 2.7, from 0.8 to 2.5, from 0.8 to 2.3, from 0.8 to 2.1, from 0.8 to 2.0, from 0.8 to 1.9, from 0.8 to 1.8, from 0.8 to 1.7, from 0.8 to 1.6, from 0.8 to 1.5, from 0.8 to 1.4, or from 0.8 to 1.3. $I_2$ is determined under ASTM D-1238, Condition E and measured at 190° C. and 2.16 kg.

In embodiments, the copolymer of ethylene and hydrolysable silane has a density (g/cc) from 0.910 g/cc to 0.970 g/cc, such as from 0.911 g/cc to 0.960 g/cc, from 0.912 g/cc to 0.950 g/cc, from 0.913 g/cc to 0.940 g/cc, from 0.913 g/cc to 0.930 g/cc, from 0.913 g/cc to 0.925 g/cc, from 0.913 g/cc to 0.925 g/cc, or from 0.913 g/cc to 0.923 g/cc, or from 0.913 g/cc to 0.922 g/cc, or from 0.913 g/cc to 0.921 g/cc, or from 0.913 g/cc to 0.920 g/cc, or from 0.913 g/cc to 0.919 g/cc, or from 0.913 g/cc to 0.918 g/cc, or from 0.913 g/cc to 0.917 g/cc, or from 0.913 g/cc to 0.916 g/cc, or from 0.913 g/cc to 0.915 g/cc. In an embodiment, the copolymer of ethylene and hydrolysable silane has a density less than 0.923 g/cc, or less than 0.922 g/cc, or less than 0.921 g/cc, or less than 0.920 g/cc, or less than 0.919 g/cc, or less than 0.918 g/cc, or less than 0.917 g/cc, or less than 0.916 g/cc. The density is measured according to ASTM D-792.

In embodiments, the crystallinity at room temperature (wt %) of the copolymer of ethylene and hydrolysable silane ranges from 5 wt % to 65 wt %, such as from 10 wt % to 60 wt %, from 15 wt % to 55 wt %, from 20 wt % to 50 wt %, from 25 wt % to 50 wt %, from 30 wt % to 50 wt %, from 35 wt % to 50 wt %, from 40 wt % to 50 wt %, from 41 wt % to 50 wt %, 42 wt % to 50 wt %, from 43 wt % to 50 wt %, from 44 wt % to 51 wt %, from 45 wt % to 50 wt %, from 46 wt % to 50 wt %, from 47 wt % to 50 wt %, from 48 wt % to 50 wt %. In embodiments, the copolymer of ethylene and hydrolysable silane has a crystallinity at room temperature less than 50 wt %, or less than 49 wt %, or less than 48 wt %, or less than 47 wt %, or less than 46 wt %, or less than 45 wt %, or less than 44 wt %, or less than 42 wt %, or less than 40 wt %, or less than 38 wt %, or less than 36 wt %, or less than 34 wt %, or less than 32 wt %, or less than 30 wt %, or less than 25 wt %, or less than 20 wt %, or less than 15 wt %. Crystallinity is measured as described in the Examples.

In embodiments, the amorphous content at room temperature (wt %) of the copolymer of ethylene and hydrolysable silane ranges from 95 wt % to 35 wt %, such as from 90 wt % to 40 wt %, from 85 wt % to 45 wt %, from 80 wt % to 50 wt %, from 75 wt % to 50 wt %, from 70 wt % to 50 wt %, from 65 wt % to 50 wt %, from 60 wt % to 50 wt %, from 59 wt % to 50 wt %, 58 wt % to 50 wt %, from 57 wt % to 50 wt %, from 56 wt % to 51 wt %, from 55 wt % to 50 wt %, from 54 wt % to 50 wt %, from 53 wt % to 50 wt %, from 52 wt % to 50 wt %. In embodiments, the copolymer of ethylene and hydrolysable silane has an amorphous content at room temperature of 50 wt % or greater, 51 wt % or greater, or 52 wt % or greater, or 53 wt % or greater, or 54 wt % or greater, or 55 wt % or greater, or 56 wt % or greater, or 58 wt % or greater, or 60 wt % or greater, or 62 wt % or greater, or 64 wt % or greater, or 66 wt % or greater, or 68 wt % or greater, or 70 wt % or greater, or 75 wt % or greater, or 80 wt % or greater, or 85 wt % or greater. Amorphous content at room temperature is calculated as "100 wt % minus crystallinity at room temperature (wt %)".

In embodiments, the copolymer of ethylene and hydrolysable silane has a product of polydispersity and density (i.e., "Density×Polydispersity" or "Density×Mw(conv)/Mn(conv)") of 6.0 or greater, or 6.1 or greater, or 6.3 or greater, or 6.5 or greater, or 6.7 or greater, or 6.9 or greater, or 7.1 or greater, or 7.5 or greater, or 8.0 or greater or 8.5 or greater, or 9.0 or greater, or 9.5 or greater, or 10.0 or greater.

In embodiments, the copolymer of ethylene and hydrolysable silane has a product of polydispersity and amorphous content at room temperature (i.e., "Amorphous Content at Room Temperature×Polydispersity" or "Amorphous Content at Room Temperature×Mw(conv)/Mn(conv)") of 355 or greater, or 360 or greater, or 370 or greater, or 380 or greater, or 390 or greater, or 400 or greater, or 410 or greater, or 420 or greater, or 430 or greater, or 440 or greater or 450 or greater, or 460 or greater, or 470 or greater, or 480 or greater.

In embodiments, the copolymer of ethylene and hydrolysable silane has a product of LCB, polydispersity and amorphous content at room temperature (i.e., "Amorphous Content at Room Temperature×Polydispersity×LCB") of 1000 or greater, 1025 or greater, 1050 or greater, 1075 or greater, 1100 or greater, 1125 or greater, 1175 or greater, 1200 or greater, 1225 or greater, 1250 or greater, 1275 or greater, 1300 or greater, 1325 or greater, 1350 or greater, 1375 or greater, 1400 or greater, 1425 or greater, 1450 or greater, 1500 or greater, 1525 or greater, 1550 or greater, 1575 or greater, 1600 or greater, 1700 or greater, 1800 or greater, or 1900 or greater.

In embodiments, the copolymer of ethylene and hydrolysable silane has terminal vinyls per 1000 carbon atoms from 0.01 to 1.0, or from 0.01 to 0.5, or from 0.01 to 0.3, or from 0.01 to 0.2, or from 0.01 to 0.1, or from 0.01 to 0.08, or from 0.02 to 0.06, or from 0.03 to 0.05.

In an embodiment, the copolymer of ethylene and hydrolysable silane comprises other units that may be derived from one or more other polymerizable comonomer(s) including (but not limited to) unsaturated esters, monomeric chain transfer agent (CTA), α-olefins, and anhydrides, each typically having no more than 20 carbon atoms. The α-olefin comonomers, which have a combined monomer and CTA functionality, may have 3 to 10 carbon atoms, or in the alternative, the α-olefin comonomers may have 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4 methyl-1-pentene and combinations thereof. In embodiments, the α-olefin comonomers are selected from propylene, 1-butene and combinations thereof. The unsaturated esters can be alkyl acrylates, alkyl methacrylates, or vinyl carboxylates. The alkyl groups can have from 1 to 8 carbon atoms, or from 1 to 4 carbon atoms. The carboxylate groups can have from 2 to 8 carbon atoms, or from 2 to 5 carbon atoms. Examples of acrylates and methacrylates include, but are not limited to, ethyl acrylate, methyl acrylate, methyl methacrylate, t-butyl acrylate, n-butyl acrylate, n-butyl methacrylate, and 2 ethylhexyl acrylate. Examples of vinyl carboxylates include, for example, vinyl acetate, vinyl propionate, and vinyl butanoate.

In embodiments, the copolymer of ethylene and hydrolysable silane contains a "branching agent". Examples of suitable branching agents are those disclosed in International Application No. WO 2016204949A1, which is incorporated herein by reference in its entirety.

According to embodiments, the copolymer of ethylene and hydrolysable silane may be branched, linear, or substantially linear, and can be made by polymerization or copolymerization in a reactor (low pressure or high pressure). As used herein, the term "high-pressure reactor" or "high-pressure process" is any reactor or process operated at a pressure of at least 5000 pounds per square inch (psi) (34.47 megaPascal or MPa). "Branched" ethylene polymers are often (but not only) prepared in a high-pressure reactor or process and tend to have highly branched polymer structures, with branches found both on the polymer backbones and on the branches themselves. In contrast, "substantially linear" denotes a polymer having a backbone that is substituted with 0.01 to 3 long-chain branches per 1,000 carbon atoms. In some embodiments, the ethylenic polymer can have a backbone that is substituted with 0.01 to 1 long-chain branches per 1,000 carbon atoms, or from 0.05 to 1 long-chain branches per 1,000 carbon atoms.

The copolymer of ethylene and hydrolysable silane may be used by itself or in blends with other polymers, including (but not limited to) ethylene polymers. Ethylene polymers used in embodiments disclosed and described herein may include both homopolymers and interpolymers, random and block copolymers, and functionalized (e.g., ethylene vinyl acetate, ethylene ethyl acrylate, etc.) and non-functionalized polymers. The ethylene interpolymers or embodiments may include at least one of elastomers, flexomers, and plastomers. The ethylene polymer may, in embodiments, comprise at least 50, such as at least 60 and more such as at least 80 wt % of units derived from ethylene. The other units of the ethylene interpolymer may be derived from one or more polymerizable monomers including, for example, α-olefins and unsaturated esters.

The α-olefin is, in embodiments, a $C_3$-$C_{20}$ linear, branched, or cyclic α-olefin. Examples of $C_3$-$C_{20}$ α-olefins include, for example, propene, 1-butene, 4-methyl-1-pentene, 1-hexene, 1-octene, 1-decene, 1-dodecene, 1-tetradecene, 1-hexadecene, and 1-octadecene. The α-olefins also may contain a cyclic structure such as cyclohexane or cyclopentane, resulting in an α-olefin, such as, for example, 3-cyclohexyl-1-propene (allyl cyclohexane) and vinyl cyclohexane. For purposes of this disclosure certain cyclic olefins, such as norbornene and related olefins, particularly 5-ethylidene-2-norbornene, are considered α-olefins and can be used in place of some or all of the α-olefins described above. Similarly, styrene and its related olefins (for example, α-methylstyrene, etc.) are considered α-olefins for purposes of this disclosure. In some embodiments, ethylene interpolymers include copolymers of ethylene/propylene, ethylene/butene, ethylene/1-hexene, ethylene/1-octene, ethylene/styrene, and the like. Illustrative ethylenic terpolymers include ethylene/propylene/1-octene, ethylene/propylene-/butene, ethylene/butene/1-octene, ethylene/propylene/diene monomer (EPDM) and ethylene/butene/styrene.

In various embodiments, the unsaturated esters can be alkyl acrylates, alkyl methacrylates, alkyl maleates or vinyl carboxylates. The alkyl groups can have from 1 to 8 carbon atoms, or from 1 to 4 carbon atoms. The carboxylate groups can have from 2 to 8 carbon atoms, or from 2 to 5 carbon atoms. Examples of acrylates and methacrylates include, but are not limited to, ethyl acrylate, methyl acrylate, methyl methacrylate, t-butyl acrylate, n-butyl acrylate, n-butyl methacrylate, and 2 ethylhexyl acrylate. Examples of vinyl carboxylates include, for example, vinyl acetate, vinyl propionate, and vinyl butanoate. Examples of alkyl maleates include, for example, monoethyl maleate.

Examples of ethylene polymers used in embodiments include, for example, high density polyethylene (HDPE); medium density polyethylene (MDPE); linear low density polyethylene (LLDPE); low density polyethylene (LDPE); very low density polyethylene (VLDPE); homogeneously branched, linear ethylene/α-olefin copolymers (e.g. TAFMER™ by Mitsui Petrochemicals Company Limited and EXACT™ by DEX-Plastomers); homogeneously branched, substantially linear ethylene/α-olefin polymers (e.g., AFFINITY™ polyolefin plastomers and ENGAGE™ polyolefin elastomers available from The Dow Chemical Company); and ethylene block copolymers (INFUSE™ also available from The Dow Chemical Company). The substantially linear ethylene copolymers are more fully described in U.S. Pat. Nos. 5,272,236; 5,278,272; and 5,986,028, and the ethylene block copolymers are more fully described in U.S. Pat. Nos. 7,579,408; 7,355,089; 7,524,911; 7,514,517; 7,582,716; and 7,504,347 all of which are incorporated herein by reference in their entireties.

According to embodiments, the hydrolysable silane may be any silane that will effectively copolymerize with ethylene and thus enable crosslinking of the ethylenic polymer. Those hydrolysable silanes described by the following formula are exemplary comonomer(s) that may be used in embodiments.

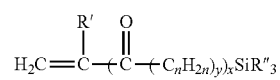

in which R' is a hydrogen atom or methyl group; x and y are 0 or 1 with the proviso that when x is 1, y is 1; n is an integer from 1 to 12 inclusive, such as 1 to 4, and each R" independently is a hydrolyzable organic group such as an alkoxy group having from 1 to 12 carbon atoms (e.g. methoxy, ethoxy, butoxy), aryloxy group (e.g. phenoxy), araloxy group (e.g. benzyloxy), aliphatic acyloxy group having from 1 to 12 carbon atoms (e.g. formyloxy, acetyloxy, propanoyloxy), amino or substituted amino groups (alkylamino, arylamino), or a lower alkyl group having 1 to 6 carbon atoms inclusive, with the proviso that not more than one of the three R" groups is an alkyl. Such hydrolysable silanes may be copolymerized with ethylene in a reactor, such as a high pressure process, to make a copolymer of ethylene and another monomer having hydrolysable silane groups. Suitable hydrolysable silanes include unsaturated silanes that comprise an ethylenically unsaturated hydrocarbyl group, such as a vinyl, allyl, isopropenyl, butenyl, cyclohexenyl or gamma-(meth)acryloxy allyl group, and a hydrolyzable group, such as, for example, a hydrocarbyloxy, hydrocarbonyloxy, or hydrocarbylamino group. Examples of hydrolyzable groups include methoxy, ethoxy, formyloxy, acetoxy, proprionyloxy, and alkyl or arylamino groups. Hydrolysable silanes include the unsaturated alkoxy silanes which can be copolymerized in-reactor with other monomers (such as ethylene and acrylates). These hydrolysable silanes and their method of preparation are more fully described in U.S. Pat. No. 5,266,627, which is incorporated herein by reference in its entirety. In embodiments, the hydrolysable silanes are selected from the group consisting of vinyltrimethoxysilane (VTMS), vinyltriethoxysilane (VTES), 3-methacryloxypropyltrimethoxysilane (M3M), vinyltriacetoxysilane, and mixtures thereof. The amount of hydrolysable silane used to functionalize the ethylenic polymer can vary widely depending upon the nature of the polymer, the silane, the processing or reactor conditions, the copolymerization efficiency, the ultimate application, and similar factors, but typically, and according to embodiment, at least 0.1, or at least 0.3, or at least 0.5, weight percent is used. Considerations of convenience and economy are two of the principal limitations on the maximum amount of hydrolysable silane used, and typically the maximum amount of hydrolysable silane is less than or equal to 5 wt %, generally it is less than or equal to 2 wt %.

Methods for Forming Copolymers of Ethylene and Hydrolysable Silane

According to embodiments, the copolymer of ethylene and hydrolysable silane is formed in an autoclave reactor or a tubular reactor or a combination thereof. In embodiments, ethylene and a hydrolysable silane component—for example, one or more of those previously described—are introduced into the reactor, along with polymerization initiator and, optionally, a chain transfer agent. The amount of hydrolysable silane component added to the reactor may, in embodiments, be within the ranges disclosed above.

For producing the copolymer and hydrolysable silane, a high pressure, free radical initiated polymerization process is typically used. Two different high pressure free radical initiated polymerization reactor types are known. In one type, an agitated autoclave vessel having one or more reaction zones is used. The autoclave reactor normally has several injection points for initiator and/or monomer feeds. In the other type, a jacketed tube having one or more reaction zones is used as a reactor. Suitable, but not limiting, reactor lengths used according to embodiments may be from 100 to 3600 meters (m), or from 1000 to 2800 m. The beginning of a reaction zone, for either type of reactor, is typically defined by the site injection of initiator of the reaction, ethylene, chain transfer agent (CTA, also known as a telomer), comonomer(s), and any combination thereof. The addition points and amounts of fresh ethylene, fresh CTA, fresh comonomer(s), and fresh branching agent (if any) may be appropriately controlled to achieve the desired ratios of CTA to ethylene and comonomer(s) to ethylene and branching agent to ethylene in the feeds to and/or in the reaction zones.

The copolymer of ethylene and hydrolysable silane used in embodiments is made in a reactor configuration comprising at least one tubular reactor and/or at least one autoclave reactor. As used in this disclosure, "reactor configuration" means the type and number of reactors used in the process to make the copolymer of ethylene and hydrolysable silane. An autoclave reactor can have one or more reactor zones. A tubular reactor can have one or more reaction zones, and a reactor configuration can comprise one or more tubular reactors, each with one or more reaction zones. In an embodiment, the reactor configuration comprises a tubular reactor and an autoclave reactor, and the tubular reactor is downstream from the autoclave reactor.

Optionally, in some embodiments, a chain transfer agent (CTA) is used to control molecular weight. In embodiments, one or more CTAs are added to the polymerization process. CTAs according to embodiments, typically comprise at least one of the following groups: alkanes, aldehydes, ketones, alcohol, ether, esters, mercaptan or phosphine. In embodiments, a CTA comprises at least one group of an alkane, an unsaturated hydrocarbon, a ketone, an aldehyde, an alcohol or ether. According to some embodiments, a CTA is selected from the group consisting of saturated hydrocarbons, unsaturated hydrocarbons, ketones, aldehydes, alcohols, ethers, esters, mercaptans or phosphines. According to some embodiments, a CTA is selected from the group consisting of saturated hydrocarbons, unsaturated hydrocarbons, ketones, aldehydes, alcohols and ethers. Exemplary CTAs include, but are not limited to, propylene, isobutane, n-butane, 1-butene, methyl ethyl ketone, acetone, ethyl acetate, propionaldehyde, ISOPAR™-C, -E, and -H (ExxonMobil Chemical Co.), and isopropanol. In one embodiment, the amount of CTA used is from 0.03 to 10 weight percent based on the weight of the total reaction mixture. In embodiments, no CTA is added to the polymerization process. In embodiments, no separate CTA is added, but the solvent used (if any) for the peroxide mixture can also work or function as CTA.

In embodiments in which CTA is added to the polymerization, the ratio of the concentration of the CTA in the feed to reaction zone i (wherein i is greater than or equal to 2 and reaction zone i is downstream from reaction zone 1) to the concentration of the CTA in the feed to reaction zone 1 is greater than or equal to 1.0, or greater than 1.5, or greater than 2.0.

In embodiments, the process includes a high pressure and low pressure recycle loop to improve ethylene efficiency, since ethylene is only partially converted or consumed per reactor pass. Typically, the conversion level per reactor pass is between 12% and 40%, with the conversion levels for tubular reactors at the higher end of this range and the conversion levels for autoclave reactors at the lower end of this range.

Free radical initiators are generally used to produce the copolymers of ethylene and hydrolysable silane according to embodiments. A free radical initiator, as used herein, refers to a free radical generated by chemical and/or radiation means. Exemplary free radical initiators include organic peroxides including, but not limited to, cyclic peroxides, diacyl peroxides, dialkyl peroxides, hydroperoxides, peroxycarbonates, peroxydicarbonates, peroxyesters, and peroxyketals. Initiators include t-butyl peroxy pivalate, di-t-butyl peroxide, t-butyl peroxy acetate and t-butyl peroxy-2-hexanoate, or mixtures thereof. In embodiments, these organic peroxide initiators are used in an amount from 0.001 wt % to 0.25 wt %, based upon the weight of polymerizable monomers.

In embodiments, an initiator is added to at least one reaction zone and the initiator has a half-life temperature at one second greater than 255° C., or greater than 260° C. In a further embodiment, such initiators are used at a peak polymerization temperature from 200° C. to 400° C., or 320° C. to 350° C. In further embodiments, the initiator comprises at least one peroxide group incorporated in a ring structure. Examples of such initiators include, but are not limited to, TRIGONOX™ 301 (3,6,9-triethyl-3,6,9-trimethyl-1,4,7-triperoxonaan) and TRIGONOX™ 311 (3,3,5,7,7-pentamethyl-1,2,4-trioxepane), both available from Akzo Nobel, and HMCH-4-AL (3,3,6,6,9,9-hexamethyl-1,2,4,5-tetroxonane) available from United Initiators. Other initiators are disclosed in International Publication Nos. WO 02/14379 and WO 01/68723, which are each incorporated herein by reference in their entireties.

The polymerization initiator may be added to the reactor in amounts mentioned above. The amount of the ethylene component added to the reactor may, in embodiments, comprise the remainder of the composition introduced into the reactor. For instance, if 2.5 wt % hydrolysable silane and 0.25 wt % polymerization initiator are fed into the reactor, and no CTA is employed and the peroxide is not in a mixture with a solvent, then 97.25 wt % (i.e., 100-2.5-0.25) ethylene component is introduced into the reactor.

The components added to the reactor may be copolymerized at temperatures from 180° C. to 400° C. and pressures from 5,000 psi (34.5 MPa) to 50,000 psi (344.7 MPa). According to embodiments, the components added to the reactor may be copolymerized at temperatures from 190° C. to 400° C., such as from 200° C. to 400° C., from 210° C. to 400° C., from 220° C. to 400° C., from 230° C. to 400° C., from 240° C. to 400° C., from 245° C. to 400° C., from 250° C. to 255° C., from 260° C. to 400° C., from 265° C. to 400° C., from 270° C. to 400° C., from 275° C. to 400° C., from 280° C. to 400° C., from 285° C. to 400° C., from 290° C. to 400° C., from 295° C. to 400° C., from 300° C. to 400° C., from 305° C. to 400° C., from 310° C. to 400° C., from 315° C. to 400° C., from 320° C. to 400° C., from 325° C. to 400° C., from 330° C. to 400° C., from 340° C. to 400° C., from 350° C. to 400° C., from 360° C. to 400° C., from 370° C. to 400° C., from 380° C. to 400° C., or from 390° C. to 400° C. In some embodiments, the components added to the reactor may be copolymerized at temperatures from 190° C. to 390° C., such as from 190° C. to 380° C., from 190° C. to 370° C., from 190° C. to 360° C., from 190° C. to 350° C., from 190° C. to 340° C., from 190° C. to 330° C., from 190° C. to 325° C., from 190° C. to 320° C., from 190° C. to 315° C., from 190° C. to 310° C., from 190° C. to 305° C., from 190° C. to 300° C., from 190° C. to 295° C., from 190° C. to 290° C., from 190° C. to 285° C., from 190° C. to 280° C., from 190° C. to 275° C., from 190° C. to 270° C., from 190° C. to 265° C., from 190° C. to 260° C., from 190° C. to 255° C., from 190° C. to 250° C., from 190° C. to 245° C., from 190° C. to 240° C., from 190° C. to 230° C., from 190° C. to 220° C., from 190° C. to 210° C., or from 190° C. to 200° C. According to other embodiments, the components added to the reactor may be copolymerized at temperatures from 190° C. to 330° C., such as from 200° C. to 325° C., from 210° C. to 320° C., from 220° C. to 315° C., from 230° C. to 310° C., from 240° C. to 305° C., from 245° C. to 300° C., or from 250° C. to 295° C.

The components added to the reactor may, according to embodiments, be copolymerized at pressures from 10,000 psi (69.0 MPa) to 45,000 psi (310.3 MPa), such as from 13,000 psi (89.6 MPa) to 40,000 psi (275.8 MPa), from 16,000 psi (110.3 MPa) to 35,000 psi (241.3 MPa), from 18,000 psi (124.1 MPa) to 35,000 psi (241.3 MPa), from 20,000 psi (137.9 MPa) to 35,000 psi (241.3 MPa), from 22,000 psi (151.7 MPa) to 35,000 psi (241.3 MPa), from 24,000 psi (165.5 MPa) to 35,000 psi (241.3 MPa), from 26,000 psi (179.3 MPa) to 35,000 psi (241.3 MPa), from 28,000 psi (193.1 MPa) to 35,000 psi (241.3 MPa), from 30,000 psi (206.8 MPa) to 35,000 psi (241.3 MPa), from 32,000 psi (220.6 MPa) to 35,000 psi (241.3 MPa), or from 34,000 psi (234.4 MPa) to 35,000 psi (241.3 MPa). According to some embodiments, the components added to the reactor may be copolymerized at pressures from 15,000 psi (103.4 MPa) to 34,000 psi (234.4 MPa), such as from 15,000 psi (103.4 MPa) to 32,000 psi (220.6 MPa), from 15,000 psi (103.4 MPa) to 30,000 psi (206.8 MPa), from 15,000 psi (103.4 MPa) to 28,000 psi (193.1 MPa), from 15,000 psi (103.4 MPa) to 26,000 psi (179.3 MPa), from 15,000 psi (103.4 MPa) to 24,000 psi (165.5 MPa), from 15,000 psi (103.4 MPa) to 22,000 psi (151.7 MPa), from 15,000 psi (103.4 MPa) to 20,000 psi (137.9.1 MPa), from 15,000 psi (103.4 MPa) to 18,000 psi (124.1 MPa), or from 15,000 psi (103.4 MPa) to 16,000 psi (110.3 MPa).

According to embodiments, the reaction may have a duration from 10 seconds to 10 minutes, such as from 30 seconds to 10 minutes, from 1 minute to 10 minutes, from 2 minutes to 10 minutes, from 3 minutes to 10 minutes, from 4 minutes to 10 minutes, from 5 minutes to 10 minutes, from 6 minutes to 10 minutes, from 7 minutes to 10 minutes, from 8 minutes to 10 minutes, or from 9 minutes to 10 minutes. In embodiments, the reaction may have a duration from 2 minutes to 9 minutes, such as from 2 minutes to 8 minutes, from 2 minutes to 7 minutes, from 2 minutes to 6 minutes, from 2 minutes to 5 minutes, from 2 minutes to 4 minutes, or from 2 minutes to 3 minutes. In some embodiments, the reaction may have a duration from 3 minutes to 9 minutes, such as from 4 minutes to 8 minutes, from 5 minutes to 7 minutes, or from 5.5 minutes to 6.5 minutes.

In embodiments, the reactor production rates may range from 10 kilotonnes per annum to 1000 kilotonnes per annum.

As disclosed above, forming a copolymer of ethylene and hydrolysable silane according to the methods disclosed and described hereinabove, provides a copolymer of ethylene and hydrolysable silane having properties, such as, for example the ratio of "Mz(abs)/Mw(abs)" to polydispersity disclosed hereinabove, that are not achieved by other methods. For instance, a commercially available copolymer of ethylene and hydrolysable silane made using a conventional tubular reactor does not have the "Mz(abs)/Mw(abs)" or polydispersity or ratio of "Mz(abs)/Mw(abs)" to polydispersity or "Density×Polydispersity" or "Amorphous Content at Room Temperature×Polydispersity" disclosed above. In addition, using different process parameters in an autoclave reactor, such as temperatures below 245° C. with propylene as chain transfer agent and at a pressure of 20,000 psi (137.9 MPa), will not yield a copolymer of ethylene and hydrolysable silane having the "Mz(abs)/Mw(abs)" or polydispersity or ratio of "Mz(abs)/Mw(abs)" to polydispersity or "Density×Polydispersity" or "Amorphous Content at Room Temperature×Polydispersity" disclosed herein. Using other different process parameters in an autoclave reactor, such as temperature of 250° C. with propylene as chain transfer agent and at a pressure of 28,000 psi (193.1 MPa), will not yield a copolymer of ethylene and hydrolysable silane having the "Mz(abs)/Mw(abs)" or polydispersity or ratio of "Mz(abs)/Mw(abs)" to polydispersity or "Density×Polydispersity" or "Amorphous Content at Room Temperature×Polydispersity" disclosed herein. Further, the "Mz(abs)/Mw(abs)" or polydispersity or ratio of "Mz(abs)/Mw(abs)" to polydispersity or "Density×Polydispersity" or "Amorphous Content at Room Temperature×Polydispersity" of the copolymer of ethylene and hydrolysable silane disclosed and described herein is not an arbitrary property of the copolymer of ethylene and hydrolysable silane. Rather, as disclosed above, making a moisture-crosslinkable polymeric composition with a copolymer of ethylene and hydrolysable silane made according to embodiments disclosed and described herein, such that the copolymer of ethylene and hydrolysable silane has the Mz(abs)/Mw(abs) and/or polydispersity and/or ratio of "Mz(abs)/Mw(abs)" to polydispersity and/or "Density×Polydispersity" and/or "Amorphous Content at Room Temperature×Polydispersity" disclosed above, results in a moisture-crosslinkable polymer composition with improved properties, such as, for example, faster crosslinking (as determined by the number of days at fixed cure conditions taken to attain a certain value of hot creep, with a specified silanol condensation catalyst and at a given thickness of the article fabricated from the composition). Such moisture-curable polymeric compositions are described herein below.

Moisture-Crosslinkable Polymeric Composition

According to embodiments, a moisture-crosslinkable polymer composition comprises the copolymer of ethylene and hydrolysable silane described hereinabove and a silanol condensation catalyst. In embodiments the silanol condensation catalyst is added to promote crosslinking and insure moisture cure of the composition. Silanol condensation catalysts include (but are not limited to) Lewis and Brønsted acids and bases. Silanol condensation catalysts that may be used in embodiments are not particularly limited and may include, for example, organic bases, carboxylic acids, sulfonic acids, and organometallic compounds including organic titanates and complexes or carboxylates of lead, cobalt, iron, nickel, zinc and tin, such as dibutyltindilaurate, dioctyltinmaleate, dibutyltindiacetate, dibutyltindioctoate, stannous acetate, stannous octoate, lead naphthenate, zinc caprylate, cobalt naphthenate; and the like. In some embodiments, the silanol condensation catalyst may be a hydrophobic catalyst, such as a hydrophobic acid catalyst. Examples of hydrophobic acid catalysts are the hydrophobic sulfonic acid catalysts that are available from King Industries, such as (but not limited to) NACURE® CD-2120 and NACURE® CD-2180. In an embodiment, the silanol condensation catalyst is included in a catalyst masterbatch blend, and the catalyst masterbatch blend is included in the composition. In an embodiment, the silanol condensation catalyst is a catalyst masterbatch blend or silanol condensation catalyst masterbatch.

In embodiments, the silanol condensation catalyst may be added as a masterbatch. The use of masterbatches to more effectively incorporate ingredients, including those used at low levels, into polyolefin resins is well known. This procedure is also useful since it minimizes the number of materials which must be stored and handled by processors.

Masterbatches according to embodiments, are prepared in much the same manner as any polyolefin composition, such as by dry blending and/or melt blending the ingredients into a relatively homogeneous mass. The masterbatch, typically in pellet form or some other form suitable for storage and/or handling, is then "letdown" into (i.e., blended with) the copolymer of ethylene and hydrolysable silane to which other ingredients or additives may have already been added, in an amount calculated to achieve the desired level of the "letdown" additives in the final product. These other additives can be added directly, or they too can be added as part of a masterbatch, such as added as part of the silanol condensation catalyst masterbatch, or as part of the masterbatch comprising flame retardants, or as part of another, different masterbatch, or as part of masterbatch containing a combination of two or more types of additives such as silanol condensation catalyst, scorch retardants, flame retardants, antioxidants, stabilizers, pigments, etc. If a masterbatch contains silanol condensation catalyst as well as one or more additives such as (but not limited to) flame retardants and pigments, it is also referred to as a silanol condensation catalyst or catalyst masterbatch blend or silanol condensation catalyst masterbatch.

According to embodiments, the silanol condensation catalyst or catalyst masterbatch blend or silanol condensation catalyst masterbatch will be present in a moisture-crosslinkable polymeric composition in an amount from 0.0 wt % to 90.0 wt %, such as from 0.0 wt % to 80.0 wt %, from 0.0 wt % to 70.0 wt %, from 0.0 wt % to 60 wt %, from 0.0 wt % to 50 wt %, from 0.0 wt % to 40 wt %, from 0.0 wt % to 30 wt %, from 0.0 wt % to 20.0 wt %, from 0.01 wt % to 20.0 wt %, from 0.03 wt % to 20.0 wt %, from 0.05 wt % to 20.0 wt %, from 0.10 wt % to 20.0 wt %, from 0.15 wt % to 20.0 wt %, from 0.20 wt % to 20.0 wt %, from 0.25 wt % to 20.0 wt %, from 0.30 wt % to 20.0 wt %, from 0.35 wt % to 20.0 wt %, from 0.40 wt % to 20.0 wt %, from 0.45 wt % to 20.0 wt %, from 0.50 wt % to 20.0 wt %, from 0.60 wt % to 20.0 wt %, from 0.70 wt % to 20.0 wt %, or from 0.80 wt % to 20.0 wt %. In some embodiments, the silanol condensation catalyst or catalyst masterbatch blend or silanol condensation catalyst masterbatch will be present in a moisture-crosslinkable polymeric composition in an amount from 0.0 wt % to 89.0 wt %, such as from 0.0 to 79.0 wt %, from 0.0 wt % to 69.0 wt %, from 0.0 wt % to 59.0 wt %, from 0.0 wt % to 49.0 wt %, from 0.0 wt % to 39.0 wt %, from 0.0 wt % to 29.0 wt %, from 0.0 wt % to 19.0 wt %, from 0.0 wt % to 18.0 wt %, from 0.0 wt % to 17.0 wt %, from 0.0 wt % to 16.0 wt %, from 0.0 wt % to 15.0 wt %, from 0.0 wt % to 14.0 wt %, from 0.0 wt % to 13.0 wt %, from 0.0 wt % to 12.0 wt %, from 0.0 wt % to 11.0 wt %, from 0.0 wt % to 10.0 wt %, from 0.0 wt % to 9.0 wt %, from 0.0 wt % to 8.0 wt %, from 0.0 wt % to 7.0 wt %, from 0.0 wt % to 6.0 wt %, from 0.0 wt % to 5.0 wt %, from 0.0 wt % to 4.0 wt %, from 0.0 wt % to 3.0 wt %, from 0.0 wt % to 2.0 wt %, or from 0.0 wt % to 1.0 wt %. In embodiments, the silanol condensation catalyst or catalyst masterbatch blend or silanol condensation catalyst masterbatch will be present in a moisture-crosslinkable polymeric composition in an amount from 0.01 wt % to 89.0 wt %, such as from 0.01 wt % to 79.0 wt %, from 0.01 wt % to 69.0 wt %, from 0.01 wt % to 59.0 wt %, from 0.01 wt % to 49.0 wt %, from 0.01 wt % to 39.0 wt %, from 0.01 wt % to 29.0 wt %, from 0.01 wt % to 19.0 wt %, from 0.03 wt % to 18.0 wt %, from 0.05 wt % to 17.0 wt %, from 0.10 wt % to 16.0 wt %, from 0.15 wt % to 15.0 wt %, from 0.20 wt % to 14.0 wt %, from 0.25 wt % to 13.0 wt %, or about 8 wt %.

In embodiments, the remainder of the moisture-crosslinkable polymeric composition comprises a copolymer of ethylene and hydrolysable silane. Thus, the moisture-crosslinkable polymeric composition comprises a copolymer of ethylene and hydrolysable silane in amounts from 10.0 wt % to 100.0 wt %, such as from 20.0 wt % to 100.0 wt %, from 30.0 wt % to 100.0 wt %, from 40.0 wt % to 100 wt %, from 50.0 wt % to 100 wt %, from 60.0 wt % to 100 wt %, from 70.0 wt % to 100 wt %, from 80.0 wt % to 100.0 wt %, from 82.0 wt % to 100.0 wt %, from 84.0 wt % to 100.0 wt %, from 86.0 wt % to 100.0 wt %, from 88.0 wt % to 100.0 wt %, from 90.0 wt % to 100.0 wt %, from 92.0 wt % to 100.0 wt %, from 94.0 wt % to 100.0 wt %, from 96.0 wt % to 100.0 wt %, or from 98.0 wt % to 100.0 wt %. In embodiments, the moisture-crosslinkable polymeric composition comprises a copolymer of ethylene and hydrolysable silane in amounts from 11.0 wt % to 100.0 wt %, such as from 21.0 to 100.0 wt %, from 31.0 wt % to 100.0 wt %, from 41.0 wt % to 100.0 wt %, from 51.0 wt % to 100.0 wt %, from 61.0 wt % to 100.0 wt %, from 71.0 wt % to 100.0 wt %, from 81.0 wt % to 100.0 wt %, from 82.0 wt % to 100.0 wt %, from 83.0 wt % to 100.0 wt %, from 84.0 wt % to 100.0 wt %, from 85.0 wt % to 100.0 wt %, from 86.0 wt % to 100.0 wt %, from 87.0 wt % to 100.0 wt %, from 88.0 wt % to 100.0 wt %, from 89.0 wt % to 100.0 wt %, from 90.0 wt % to 100.0 wt %, from 91.0 wt % to 100.0 wt %, from 92.0 wt % to 100.0 wt %, from 93.0 wt % to 100.0 wt %, from 94.0 wt % to 100.0 wt %, or from 95.0 wt % to 100.0 wt %, from 96.0 wt % to 100.0 wt %, from 97.0 wt % to 100.0 wt %, from 98.0 wt % to 100.0 wt %, from 99.0 wt % to 100.0 wt %, from 80.0 wt % to 98.0 wt %, from 80.0 wt % to 96.0 wt %, from 80.0 wt % to 94.0 wt %, from 80.0 wt % to 92.0 wt %, from 80.0 wt % to 90.0 wt %, from 80.0 wt % to 88.0 wt %, from 80.0 wt % to 86.0 wt %, from 80.0 wt % to 84.0 wt %, or from 80.0 wt % to 82.0 wt %. In some embodiments, the moisture-crosslinkable polymeric composition comprises a copolymer of ethylene and hydrolysable silane in amounts from 11.0 wt % to 99.99 wt %, such as from 21.0 wt % to 99.99 wt %, from 31.0 wt % to 99.99 wt %, from 41.0 wt % to 99.99 wt %, from 51.0 wt % to 99.99 wt %, from 61.0 wt % to 99.99 wt %, from 71.9 wt % to 99.99 wt %, from 81.9 wt % to 99.99 wt %, from 82.0 wt % to 99.97 wt %, from 83.0 wt % to 99.95 wt %, from 84.0 wt % to 99.90 wt %, from 85.0 wt % to 99.85 wt %, from 86.0 wt % to 99.80 wt %, from 87.0 wt % to 99.75 wt %, from 88.5 wt % to 95.5 wt %, such as from 89.0 wt % to 95.0 wt %, from 89.5 wt % to 94.5 wt %, from 90.0 wt % to 94.0 wt %, from 90.5 wt % to 93.5 wt %, or from 91.0 wt % to 92.0 wt %, or about 92 wt %.

Compounding of the moisture-crosslinkable, polymeric composition can be effected by standard methods. Examples of compounding equipment include internal batch mixers, such as a BANBURY™ or BOLLING™ internal mixer. Alternatively, continuous single or twin screw mixers can be used, such as a tape extrusion setup, FARREL™ continuous mixer, a WERNER AND PFLEIDERER™ twin screw mixer, or a BUSS™ kneading continuous extruder. The type of mixer utilized, and the operating conditions of the mixer, will affect properties of the composition and fabricated article such as viscosity, volume resistivity, and extruded surface smoothness, and these are well known to those skilled in the art.

As disclosed above, one of the unexpected properties obtained by using a copolymer of ethylene and hydrolysable silane having the properties disclosed herein and/or made according to the methods disclosed herein, is faster cross-linking (as determined by the number of days at fixed cure conditions taken to attain a certain value of hot creep, with a specified silanol condensation catalyst or catalyst masterbatch blend or silanol condensation catalyst masterbatch and at a given thickness of the article fabricated from the composition). In an embodiment, the moisture-crosslinkable polymeric composition has a hot creep, measured at 0.2 MPa and 150° C. or 200° C. on extruded tape with a thickness of 50 mil (1.270 mm) to 80 mil (2.032 mm), or 60 mil (1.524 mm) to 70 mil (1.778 mm), of less than or equal to 100% within 15 days or less than or equal to 80% within 23 days, where the tape made of the moisture-crosslinkable polymeric composition has been cured at 23° C. and 50% relative humidity.

In some embodiments, the moisture-crosslinkable polymeric composition has a hot creep—measured as disclosed above—of less than or equal to 95% within 15 days, such as less than or equal to 90% within 15 days, less than or equal to 85% within 15 days, less than or equal to 80% within 15 days, or less than or equal to 75% within 15 days. In some embodiments, the moisture-crosslinkable polymeric composition has a hot creep—measured as disclosed above—of less than or equal to 75% within 23 days, such as less than or equal to 70% within 23 days, less than or equal to 65% within 23 days, less than or equal to 60% within 23 days, or less than or equal to 55% within 23 days.

According to some embodiments, the moisture-crosslinkable polymeric composition has a hot creep, measured at 0.2 MPa and 150° C. or 200° C. on extruded tape with a thickness of 30 mil (0.762 mm) to 80 mil (2.032 mm), of less than or equal to 175% after curing the tape for 4 hours to 20 hours in a 90° C. water bath, such as less than or equal to 150% after curing the tape for 4 hours to 20 hours in a 90° C. water bath, less than or equal to 125% after curing the tape for 4 hours to 20 hours in a 90° C. water bath, less than or equal to 100% after curing the tape for 4 hours to 20 hours in a 90° C. water bath, less than or equal to 80% after curing the tape for 4 hours to 20 hours in a 90° C. water bath, or less than or equal to 60% after curing the tape for 4 hours to 20 hours in a 90° C. water bath, or less than or equal to 50% after curing the tape for 4 hours to 20 hours in a 90° C. water bath, or less than or equal to 40% after curing the tape for 4 hours to 20 hours in a 90° C. water bath, or less than or equal to 30% after curing the tape for 4 hours to 20 hours in a 90° C. water bath, or less than or equal to 25% after curing the tape for 4 hours to 20 hours in a 90° C. water bath, or less than or equal to 20% after curing the tape for 4 hours to 20 hours in a 90° C. water bath, or less than or equal to 15% after curing the tape for 4 hours to 20 hours in a 90° C. water bath, or less than or equal to 10% after curing the tape for 4 hours to 20 hours in a 90° C. water bath, or less than or equal to 5% after curing the tape for 4 hours to 20 hours in a 90° C. water bath.

In addition to copolymer of ethylene and hydrolysable silane and silanol condensation catalyst or catalyst masterbatch blend or silanol condensation catalyst masterbatch, the moisture-crosslinkable polymeric composition may comprise various additives conventionally added to moisture-crosslinkable polymeric compositions. Such additives include (but are not limited to) antioxidants, scorch retardants (including, but not limited to, moisture scavengers), flame retardants (including organic fillers), UV stabilizers and absorbers (including carbon black), metal deactivators (such as, for example, oxalyl bis(benzylidene)hydrazide), polyolefins without silane functionality, silicones, and mixtures thereof.

According to one or more embodiments, the moisture-curing polymeric composition may comprise: (A) the copolymer of ethylene and hydrolysable silane disclosed and described herein in amounts from 10.00 to less than 100.00 wt %, such as from 10.00 to 99.95 wt %, from 20.00 wt % to less than 100.00 wt %, from 30.00 wt % to 99.00 wt %, from 40.00 wt % to 97.00 wt %, or from 50.00 wt % to 96 wt %, or from 60.00 to 98.00 wt %, or from 70.00 to 99.00 wt %, or from 80.00 to 99.50 wt %, or from 90.00 to 99.90 wt %; (B) the silanol condensation catalyst or catalyst masterbatch blend or silanol condensation catalyst masterbatch disclosed and described herein in amounts from 0.00 wt %, or from 0.05 wt % to 90.0 wt %, from greater than 0.00 wt % to 20.00 wt %, from 0.05 wt % to 15.00 wt %, from 0.10 wt % to 10.00 wt %, or from 0.15 wt % to 5.00 wt %; (C) moisture scavengers or scorch retardants from 0.00 wt % to 5.00 wt %, such as from 0.10 wt % to 3.00 wt %, 0.20 wt % to 2.00 wt %, from 0.30 wt % to 1.00 wt %; (D) antioxidants in amounts from 0.00 wt % to 2.00 wt %, from 0.01 wt % to 1.50 wt %, from 0.02 wt % to 1.00 wt %, or from 0.03 wt % to 0.70 wt %; and (E) flame retardants in amounts from 0.00 wt % to 90.00 wt %, such as from 0.00 wt % to 80.00 wt %, from 10.00 wt % to 70.00 wt %, from 20.00 wt % to 60.00 wt %, or from 30.00 wt % to 50.00 wt %. It should be understood that according to embodiments, additional additives—such as UV stabilizers and absorbers, metal deactivators, polyolefins without silane functionality, and silicones—may be added to the moisture-crosslinkable polymeric composition in minor or major amounts (either individually or in aggregate), such as less than 90.00 wt %, less than 80.00 wt %, less than 70.00 wt %, less than 60.00 wt %, less than 50.00 wt %, less than 40.00 wt %, less than 30.00 wt %, less than 20.00 wt %, less than 10.00 wt %, less than 8.00 wt %, less than 6.00 wt %, less than 4.00 wt %, less than 2.00 wt %, less than 1.00 wt %, less than 0.50 wt %, less than 0.25 wt %, less than 0.20 wt %, or less than 0.10 wt %. It should also be understood that, according to embodiments, any of the above ranges may be combined with any other of the above ranges.

Products Comprised the Moisture-Crosslinkable Polymeric Composition

The moisture-crosslinkable polymeric composition may be applied to a conductor as a coating (including a sheath that is an insulation and/or a protective jacket) in known amounts or thicknesses and by known methods to make an article that is a wire or cable (for example, with the equipment and methods described in U.S. Pat. Nos. 5,246,783 and 4,144,202, each of which are incorporated herein by reference in their entirety). Typically, the polymeric composition is prepared in an extruder equipped with a conductor-coating die and after the composition is formulated, the composition is extruded over the conductor as the conductor is drawn through the die.

Other articles of manufacture that can be prepared from the moisture-crosslinkable polymeric composition, particularly under high pressure and/or high temperature and/or elevated moisture conditions, include fibers, ribbons, sheets, tapes, tubes, pipes, weather-stripping, seals, gaskets, foams, footwear and bellows. These articles can be manufactured using known equipment and techniques.

The articles made from the moisture-curable, polymeric compositions can be moisture-cured in a water bath or a sauna or at ambient conditions to affect crosslinking. The time to complete crosslinking will depend on conditions such as article or coating thickness, temperature, humidity, catalyst employed, etc.

EXAMPLES

Embodiments will be further clarified by the following examples.

Test Conditions and Parameters

Density

Ethylene-based polymers that are tested for density are prepared according to ASTM D 1928. Samples are pressed at 374° F. (190° C.), and 30,000 psi (207 MPa), for three minutes, and then at 70° F. (21° C.) and 30,000 psi (207 MPa) for one minute. Density measurements are made after 40 hours of sample pressing, using ASTM D792, Method B.

Unsaturation Content

Unsaturation content of ethylene-based polymers (including terminal vinyls per 1000 carbon atoms) is determined by nuclear magnetic resonance (NMR), Fourier Transform Infrared Spectroscopy (for instance, as per the procedure described in U.S. Pat. No. 8,912,297 B2) or any other known method (or yet to be developed method). An example of NMR spectroscopic method used to determine types and amounts of unsaturation in ethylene-based polymers can be found in Busico, V., et al., *Macromolecules*, 2005, 38, 6988. Proton ($^1$H) NMR is used for this purpose in this study.

Long Chain Branch Content

The long chain branch content (LCB; $C_6$ and higher per 1000 carbon atoms) is determined by $^{13}$C NMR.

Crystallinity

Crystallinity of any ethylenic polymer is measured as follows: Determine melting peaks and percent (%) or weight percent (wt %) crystallinity of ethylenic polymer using Differential Scanning Calorimeter (DSC) instrument DSC Q1000 (TA Instruments).

(A) Baseline calibrate instrument. Use software calibration wizard. First obtain a baseline by heating a cell from −80° to 280° C. without any sample in an aluminum DSC pan. Then use sapphire standards as instructed by the calibration wizard. The analyze 1 to 2 milligrams (mg) of a fresh indium sample by heating the standards sample to 180° C., cooling to 120° C. at a cooling rate of 10° C./minute, then keeping the standards sample isothermally at 120° C. for 1 minute, followed by heating the standards sample from 120° C. to 180° C. at a heating rate of 10° C./minute. Determine that indium standards sample has heat of fusion=28.71±0.50 Joules per gram (J/g) and onset of melting=156.6°+0.5° C.

(B) Perform DSC measurements on test samples using same DSC instrument. Press test sample of semi-crystalline ethylenic polymer into a thin film at a temperature of 160° C. Weigh 5 to 8 mg of test sample film in DSC pan. Crimp lid on pan to seal pan and ensure closed atmosphere. Place sealed pan in DSC cell, equilibrate cell at 30° C., and heat at a rate of about 100° C./minute to 190° C., keep sample at 190° C. for 3 minutes, cool sample at a rate of 10° C./minute to −60° C. to obtain a cool curve heat of fusion (Hf, and keep isothermally at −60° C. for 3 minutes. Then heat sample again at a rate of 10° C./minute to 190° C. to obtain a second heating curve heat of fusion (ΔHf). Using the second heating curve, calculate the "total" heat of fusion (J/g) by integrating from −20° C. (in the case of ethylene homopolymers, copolymers of ethylene and hydrolysable silane monomers, and ethylene alpha olefin copolymers of density greater than or equal to 0.90 g/cm$^3$) or −40° C. (in the case of copolymers of ethylene and unsaturated esters, and ethylene alpha olefin copolymers of density less than 0.90 g/cm$^3$) to end of melting. Using the second heating curve, calculate the "room temperature" heat of fusion (J/g) from 23° C. (room temperature) to end of melting by dropping perpendicular at 23° C. Measure and report "total crystallinity" (computed from "total" heat of fusion) as well as "crystallinity at room temperature" (computed from "room temperature" heat of fusion). Crystallinity is measured and reported as percent (%) or weight percent (wt %) crystallinity of the polymer from the test sample's second heating curve heat of fusion (ΔHf) and its normalization to the heat of fusion of 100% crystalline polyethylene, where % crystallinity or wt % crystallinity=(ΔHf*100%)/292 J/g, wherein ΔHf is as defined above, * indicates mathematical multiplication, / indicates mathematical division, and 292 J/g is a literature value of heat of fusion (ΔHf) for a 100% crystalline polyethylene.

Hot Creep

Hot creep (also known as hot set elongation, HSE) is measured to determine the degree of cure (crosslinking). Testing is based on the Insulated Cable Engineers Association ICEA-T-28-562-2003 standard for power cable insulation materials. Specimens are taken out along the extrusion direction from crosslinked tapes of thickness values ranging from 30 mil (0.762 mm) to 80 mil (2.032 mm). Three test specimens of each sample are cut using ASTM D 412 type D tensile bars (dumbbells). Hot creep testing is conducted on specimens (of measured thickness values) in an oven with a glass door set at 150° C. or 200° C. with a force of 0.2 MPa stress applied to the bottom of the specimens. The test specimens are fixed vertically from upper ends in the oven with load attached to the lower end of each test specimen. The specimens are subjected to the hot creep test for 15 minutes at a fixed temperature and the percentage increases in length are measured at that time interval, with the average values of the three measurements reported as "hot creep". The values of percentage hot creep (or HSE) are calculated as stipulated in [0123] of EP2508566, which is incorporated herein by reference in its entirety.

Melt Index

Melt index ($I_2$) values of ethylene-based polymers are measured in accordance to ASTM D1238 at 190° C. at 2.16 kg.

Gel Permeation Chromatography

A Triple Detector Gel Permeation Chromatography (3D-GPC or TDGPC) system consisting of a PolymerChar (Valencia, Spain) high temperature chromatograph GPC-IR, equipped with a 2-angle laser light scattering (LS) detector Model 2040 from Precision Detectors, now Agilent Technologies (CA, USA), and a 4-capillary solution viscometer (DP) from PolymerChar is used. Data collection is performed using Polymer Char "GPC One" software. The system is also equipped with an online solvent degassing device from Agilent Technologies.

High temperature GPC columns consisting of four 30 cm, 20 um mixed A LS columns from Agilent Technologies are used. The GPC-IR autosampler oven is operated at 160° C., and the column compartment is operated at 150° C. The samples are prepared semi-automatically via dosing from the GPC-IR syringe at a concentration of 2 mg/ml with an including decani flow rate marker delivered via micro pump. The chromatographic solvent and the sample preparation solvent is 1,2,4-dichlorobenzene (TAB) containing 200 ppm of 2,6-di-tart-butyl-4methylphenol (BHT). The solvent is sparged with nitrogen. The polymer samples are shaken at 160° C. for three hours. The injection volume is 200 microliters. The flow rate through the GPC is set at 1.0 ml/minute.

Column calibration and sample molecular weight calculations are performed using Polymer Char "GPC One" software. Calibration of the GPC columns is performed with 21 narrow molecular weight distribution polystyrene standards obtained from Polymer Laboratories (now Agilent Technologies). The molecular weights of the polystyrene standards range from 580 to 8,400,000 g/mol and are arranged in 6 "cocktail" mixtures with at least a decade of separation between the individual molecular weights with individual concentrations ranging from 0.25 (Mp>500,000) to 0.5 mg/ml (Mp<500,000), dissolving for 24 hours in TCB at room temperature in a dark environment.

The peak molecular weights of polystyrene standards are converted to polyethylene molecular weights using the following equation (as described in Williams and Ward, J. Polym. Sci., Polym. Let., 6, 621 (1968)):

$$M_{polyethylene} = A(M_{polystyrene})^B$$

Here, B has a value of 1.0, and the experimentally determined value of A is 0.38 to 0.44.

The column calibration curve is obtained by fitting a first order polynomial to the respective polyethylene-equivalent calibration points obtained from the above Equation to the observed elution volumes.

The conventional number and weight-average molecular weights (Mn(conv) and Mw(conv), respectively) are calculated according to the following equations:

$$\overline{Mn} = \frac{\sum^i Wf_i}{\sum_i (Wf_i / M_i)}$$

$$\overline{Mw} = \frac{\sum^i (Wf_i * M_i)}{\sum_i Wf_i}$$

where, $Wf_i$ is the weight fraction of the i-th component and $M_i$ is the molecular weight of the i-th component. The polydispersity or molecular weight distribution (MWD) is expressed as the ratio of the conventional weight average molecular weight (Mw) to the conventional number average molecular weight (Mn), that is, Mw(conv)/Mn(conv).

The A value is determined by adjusting the A value in the Williams and Ward Equation until Mw, the weight average molecular weight, calculated using the above Equation, and the corresponding retention volume polynomial agreed with the independently determined value of Mw, obtained in accordance with a linear polyethylene homopolymer reference with known absolute weight-average molecular weight of 115,000 g/mol as measured by LALLS in a manner traceable to standard homopolymer polyethylene NBS1475.

The absolute weight average molecular weight (Mw(abs)) are characterized by the baseline-subtracted LS (15 degree angle) and IR-5 (measurement signal) concentration detectors using the following equation:

$$Mw(abs) = K_{LS} * \frac{\sum (LS_i)}{\sum (IR_i)}$$

wherein $\Sigma(LS_i)$ is the response area of the LS detector, $\Sigma(IR_i)$ is the response area of the IR-4 detector, and $K_{LS}$ is the instrument constant which was determined using a standard NIST 1475 with known concentration and certificated value for the weight average molecular weight of 52,000 g/mol.

The absolute molecular weight at each elution volume is calculated using the following equation:

$$M_{LS,i} = K_{LS} * \frac{LS_i}{IR_i}$$

wherein $K_{LS}$ is the determined instrument constant, $LS_i$ and $IR_i$ are the baseline-subtracted LS (15 degree) and IR5 (measurement) detector responses of the same i-th elution component.

The absolute number average and z average molecular weight are calculated with the following equations:

$$Mn(abs) = K_{LS} \frac{\sum (IR_i)}{\sum (IR_i) / \left(\frac{LS_i}{IR_i}\right)}$$

$$Mz(abs) = K_{LS} \frac{\sum IR_i * \left(\frac{LS_i}{IR_i}\right)^2}{\sum IR_i * \left(\frac{LS_i}{IR_i}\right)}$$

A linear extrapolation was performed on log $M_{LS,i}$-elution volume plot when the log $M_{LS,i}$ data scattered caused by low LS or IR detector responses.

The ratio of the absolute z average molecular weight to the absolute weight average molecular weight (Mz(abs)/Mw (abs)) is computed.

FTIR Test Method for Characterization of VTMS Content in Copolymers:

FTIR was used to determine the wt % VTMS present in the copolymer samples. The method is based on measuring the absorbance's at 1193 cm$^{-1}$ (Si—O—CH$_3$) and 2019 cm$^{-1}$ (pathlength normalization band) with baseline points set at 1230 cm$^{-1}$-1165 cm$^{-1}$ and 2106 cm$^{-1}$-1979 cm$^{-1}$, respectively. The ratio of the 1193/2019 peak heights is compared against a calibration curve prepared from standards with known levels of VTMS. Sample films approx. 3 mils thick are compression molded between Teflon sheets using a hydraulic press. Films are prepared by preheating the sample at 190° C. with heated platens partially closed (⅛" gap between upper and lower platen) for 1 min followed by pressing the sample for 30 s at 40000 lbs. The sample is allowed to cool to room temperature on the lab bench and used for analysis.

X-Ray Fluorescence (XRF) Test Method for Characterization of Hydrolysable Silane Group Content in Copolymers:

The silicon (Si) content (wt %) in the copolymer was also determined using X-ray fluorescence (XRF). The details of the test method employed are given below.

The powder sample was pressed to an approximately 6 mm thick plaque using a Buehler SimpliMet 300 automatic mounting press [3 min preheat; followed by 1 min hold time at 240° F. (115.6° C.), under 1200 psi (8.3 MPa, 84.4 kg/cm$^2$) pressure and cooled to room temperature]. Si content was analyzed by wavelength dispersive XRF (PANalytical Axios).

The PANalytical Axios is a wavelength dispersive X-ray spectrometer. The basic principle of this analytical technique is as follows. A sample of appropriate size and dimension is placed in an analysis cup and irradiated with radiation from an X-ray tube. These X-rays causes the elements (F to U) in the sample to undergo the process of fluorescence with the emission of secondary X-rays. Each element fluoresces X-rays at specific wavelengths and energies. These secondary X-rays are dispersed with diffraction crystals of appropriate spacing and are measured by flow or scintillation detectors configured at angles specific to lines of interest.

Analyte concentration is determined by comparison of line intensity with a calibration curve established, for the element of interest. Calibration curve is established using polymer standards with known concentrations, of the element of interest, analyzed by Neutron Activation Analysis (NAA) or Inductively Coupled Plasma (ICP).

The XRF results show the total content (wt %) of Si which is then used to calculate the content (wt %) of hydrolysable silane groups in the copolymer from the molecular weight of the hydrolysable silane groups (which, in the case of VTMS, is 148.23 g/mol).

NMR Test Method for Characterization of Total Hydrolysable Silane Groups Content in Copolymers and Content of Primary Hydrolysable Silane Groups:

As an alternative to XRF and FTIR, proton ($^1$H) NMR was used to measure the content of total hydrolysable silane groups in copolymers (mols Si(OCH$_3$)$_3$/1000 C) as well as content of terminal hydrolysable silane groups (mols Si—CH$_2$/1000 C). Hydrolysable silane groups content (wt %)=100×[(mols Si(OCH$_3$)$_3$/1000 C×"molecular weight of hydrolysable silane groups in g/mol")/(mols Si(OCH$_3$)$_3$/1000 C×"molecular weight of hydrolysable silane groups in g/mol"+1000×14)]. In the case of VTMS, the molecular weight of hydrolysable silane groups is 148.23 g/mol.

Computation of Mol % Hydrolysable Silane Groups Content in Copolymers from FTIR, XRF and NMR Measurements:

Mol % hydrolysable silane groups=("wt % hydrolysable silane groups"/"molecular weight of hydrolysable silane groups in g/mol")/(("wt % hydrolysable silane groups"/"molecular weight of hydrolysable silane groups in g/mol")+((100−"wt % hydrolysable silane groups")/"molecular weight of ethylene in g/mol"))×100.

Examples 1-3 and Comparative Examples 1-3

Ethylene-VTMS Reactor Copolymer Preparation:

The amounts of each of the materials used in these examples and comparative examples are provided in Table 1 below. In general, into a stirred autoclave of a capacity of 545 milliliters (ml), a mixture of ethylene, vinyltrimethoxysilane (VTMS; XIAMETER™ OFS-6300 Silane (product of Dow Silicones Corporation); KBM-1003 (product of Shin-Etsu Chemical Company) and optionally propylene (as a chain transfer agent used in Comparative Examples 1 to 3) was charged. Either t-butyl peroxyacetate (PA; Luperox 7M75 (manufactured by Arkema); Trigonox F-C50 (manufactured by Sigma Aldrich)) or t-butyl peroxy-2-ethylhexanoate (PO; Luperox 26 (manufactured by Arkema); Trigonox 21S (manufactured by Sigma Aldrich)), the former at 0.25 wt % or 0.2 wt % loadings and the latter as 2 wt % or 3 wt % of a 5 wt % solution in odorless mineral spirit, was added as a polymerization initiator to the mixture, which was subjected to a set pressure of approximately 20,000 psi (1,406 kg/cm$^2$) or 28,000 psi (1,969 kg/cm$^2$). The temperatures were set to vary from approximately 190° C. to approximately 250° C. (as shown in Table 1). Under these and other conditions as shown in Table 1 ethylene-VTMS copolymers were continuously synthesized and subsequently converted into pellet forms by melt extrusion. The conditions listed in Table 1 are averages over the time span that the samples were collected. The "autoclave-made" experimental reactor copolymers thus formed were found to have the characteristics set forth in Table 2 and Table 3. All the copolymers essentially contained similar amounts of VTMS (approximately 1.5 wt % as measured by FTIR or XRF), but there were significant differences in molecular weight characteristics and melt rheological properties. Also shown in Table 2 are the characteristics of a commercially available copolymer of ethylene and hydrolysable silane groups (SI-LINK™ DFDA-5451 NT) made using a conventional tubular reactor, which is also a comparative example.

In contrast to Comparative Examples 1 to 3 as well as SI-LINK™ DFDA-5451 NT, the Examples of the present disclosure all desirably exhibited Mz(abs)/Mw(abs) of less than or equal to 9.5, and/or a ratio of "Mz(abs)/Mw(abs)" to polydispersity of less than or equal to 1.5, and/or a polydispersity of 6.6 or greater, and/or "Density×Polydispersity" of 6.0 or greater, and/or "Amorphous Content at Room Temperature×Polydispersity" of 360 or greater (Table 2).

TABLE 1

| | Polymerization Conditions | | | | | | |
|---|---|---|---|---|---|---|---|
| Sample | Reactor Pressure (psi) | Reactor Temperature (° C.) | Ethylene Feed Rate (lb/hr) | VTMS Feed Rate (lb/hr) | Propylene Feed rate (lb/hr) | Initiator Feed Rate (cc/hr) | Ethylene Conversion (%) |
| Ex. 1 | 19582 | 250.7 | 25.0 | 0.15 | 0.0 | 33.7 (PA) | 11.8 |
| Ex. 2 | 20503 | 250.0 | 25.2 | 0.17 | 0.0 | 32.0 (PA) | 12.2 |
| Ex. 3 | 19540 | 250.2 | 25.0 | 0.18 | 0.0 | 21.2 (PA) | 11.5 |
| C. Ex. 1 | 19604 | 220.1 | 25.0 | 0.22 | 0.34 | 29.6 (PO) | 10.6 |

TABLE 1-continued

| | Polymerization Conditions | | | | | | |
|---|---|---|---|---|---|---|---|
| Sample | Reactor Pressure (psi) | Reactor Temperature (° C.) | Ethylene Feed Rate (lb/hr) | VTMS Feed Rate (lb/hr) | Propylene Feed rate (lb/hr) | Initiator Feed Rate (cc/hr) | Ethylene Conversion (%) |
| C. Ex. 2 | 19547 | 190.1 | 25.0 | 0.21 | 0.77 | 29.5 (PO) | 9.2 |
| C. Ex. 3 | 28092 | 250.1 | 25.0 | 0.17 | 0.43 | 31.9 (PA) | 11.5 |

TABLE 2

| | Ethylene-VTMS Copolymer Characteristics | | | | | | | |
|---|---|---|---|---|---|---|---|---|
| Sample | Melt Index (g/10 min) | VTMS Content (wt %) FTIR/XRF | VTMS Content (mol %) FTIR/XRF | LCB ($C_6$ and higher/1000C) – $^{13}C$ NMR | Density (g/cc) | Mw(conv)/Mn(conv) – Polydispersity | Mz(abs)/Mw (abs) | Ratio of Mz(abs)/Mw(abs) to Polydispersity |
| Experimental Products | | | | | | | | |
| Ex. 1 | 1.61 | 1.47/NM | 0.28/NM | 3.103 | 0.9166 | 7.33 | 7.58 | 1.03 |
| Ex. 2 | 1.07 | 1.57/1.64 | 0.30/0.31 | 3.276 | 0.9170 | 6.62 | 7.52 | 1.14 |
| Ex. 3 | 1.83 | 1.43/NM | 0.27/NM | 3.107 | 0.9162 | 7.51 | 7.17 | 0.96 |
| C. Ex. 1 | 1.26 | 1.51/NM | 0.29/NM | 2.342 | 0.9196 | 5.76 | 9.94 | 1.73 |
| C. Ex. 2 | 2.18 | 1.57/1.67 | 0.30/0.32 | 2.166 | 0.9208 | 4.92 | 13.85 | 2.82 |
| C. Ex. 3 | 1.19 | 1.53/1.58 | 0.29/0.30 | 2.756 | 0.9201 | 6.51 | 17.44 | 2.68 |
| Commercial Products | | | | | | | | |
| SI-LINK™ DFDA-5451 NT | 1.5 | 1.5/1.44 | 0.29/0.28 | 2.817 | 0.922 | 6.12 | 18.85 | 3.08 |

| | Ethylene-VTMS Copolymer Characteristics | | | | |
|---|---|---|---|---|---|
| Sample | Polydispersity × Density | Crystallinity at Room Temperature (wt %) | Amorphous Content at Room Temperature (wt %) | Amorphous Content at Room Temperature × Polydispersity | Amorphous Content at Room Temperature × Polydispersity × LCB |
| Experimental Products | | | | | |
| Ex. 1 | 6.72 | 42.63 | 57.37 | 420.52 | 1304.9 |
| Ex. 2 | 6.07 | 43.20 | 56.80 | 376.02 | 1231.8 |
| Ex. 3 | 6.88 | 43.06 | 56.94 | 427.62 | 1328.6 |
| C. Ex. 1 | 5.30 | 45.83 | 54.17 | 312.02 | 730.8 |
| C. Ex. 2 | 4.53 | 47.94 | 52.06 | 256.14 | 554.8 |
| C. Ex. 3 | 5.99 | 45.55 | 54.45 | 354.47 | 976.9 |
| Commercial Products | | | | | |
| SI-LINK™ DFDA-5451 NT | 5.64 | 46.87 | 53.13 | 325.16 | 916.0 |

NM: Not measured

TABLE 3

Proton NMR Characterization of Copolymers

| Sample | c/t vinylenes/ 1000C | trisubstituted/ 1000C | vinyls/ 1000C | vinylidenes/ 1000C | total hydrolysable silane groups – mols Si(OCH$_3$)$_3$ / 1000C | terminal mols Si—CH$_2$/ 1000C | VTMS Content (wt %) | VTMS Content (mol %) |
|---|---|---|---|---|---|---|---|---|
| Ex. 1 | 0.059 | 0.152 | 0.035 | 0.101 | 1.356 | 0.105 | 1.42 | 0.27 |
| Ex. 2 | 0.060 | 0.168 | 0.038 | 0.079 | 1.266 | 0.079 | 1.32 | 0.25 |
| Ex. 3 | 0.063 | 0.201 | 0.045 | 0.109 | 1.295 | 0.091 | 1.35 | 0.26 |
| C. Ex. 1 | 0.066 | 0.130 | 0.150 | 0.019 | 1.342 | 0.081 | 1.40 | 0.27 |
| C. Ex. 2 | 0.062 | 0.077 | 0.250 | 0.013 | 1.309 | 0.057 | 1.37 | 0.26 |
| C. Ex. 3 | 0.062 | 0.079 | 0.168 | 0.050 | 1.252 | 0.081 | 1.31 | 0.25 |
| SI-LINK ™ DFDA-5451 NT | 0.046 | 0.037 | 0.232 | 0.133 | 1.290 | 0.057 | 1.35 | 0.26 |

Examples 4-8 and Comparative Examples 4-8

The compositions of these examples and comparative examples are shown in Table 4 to 5 below, and were made as described herein. The ethylene-VTMS copolymers of Examples 1-3 and Comparative Examples 1-3 were used as received, that is, in the form of pellets. SI-LINK™ DFDA-5451 NT is a commercial "tubular-made" ethylene-VTMS copolymer (manufactured by The Dow Chemical Company), containing 1.5 wt % VTMS, having a density of 0.922 g/cm$^3$ and a melt index of 1.5 g/10 min, and is also in the form of pellets. SI-LINK™ AC DFDB-5451 NT is a commercial "tubular-made" ethylene-VTMS copolymer (manufactured by The Dow Chemical Company), containing 1.5 wt % VTMS, having a density of 0.922 g/cm$^3$ and a melt index of 1.5 g/10 min, which additionally contains a scorch retardant additive (SRA) and is also in the form of pellets. SI-LINK™ DFDA-5451 NT and SI-LINK™ AC DFDB-5451 NT are comparative examples of commercially available copolymers of ethylene and hydrolysable silane groups.

In the case of Example 7, a scorch retardant additive or moisture scavenger (PROSIL 9202; octyltriethoxysilane; product of Milliken Chemical) was soaked into the ethylene-VTMS copolymer pellets of Example 1 as follows: PROSIL 9202 was added to copolymer pellets in a jar at room temperature, and tumble blended for 10 minutes; the jar was placed in an oven at 70° C. for 30 minutes, removed and tumbled again for 10 minutes; and the jar containing PROSIL 9202 soaked copolymer pellets was kept for up to 96 hr at room temperature, and tumbled again for 10 minutes before use. Note that no scorch retardant additive was imbibed in the ethylene-VTMS copolymer pellets of Examples 1 to 3 utilized for Examples 4-6 and Example 8, nor in the ethylene-VTMS copolymer pellets of Comparative Examples 1 to 3 and SI-LINK™ DFDA-5451 NT utilized for Comparative Examples 4-6 and Comparative Example 8.

Physical blends (in a plastic bag) were made of the copolymer pellets (in the case of Example 7, also containing scorch retardant additive) and SI-LINK™ AC DFDB-5418 BK EXP1 silanol condensation catalyst masterbatch pellets (manufactured by The Dow Chemical Company). These were fed to a Brabender ¾" extruder equipped with 25:1 double mixing zone (pineapple) screw, to make tape (using a 2" wide die) of approximately 58 to 72 mil (1.5 mm to 1.8 mm) thickness. The set temperature profile across the zones was 150° C., 160° C., 170° C., and 170° C. at the head/die. A 40/60/40 mesh screen pack was employed and the screw speed was 60 rpm. Note that SI-LINK™ AC DFDB-5418 BK EXP1 contains a hydrophobic acid, which functions as the silanol condensation catalyst, as well as polyethylene, carbon black, octyltriethoxysilane (n-octyltriethoxysilane), antioxidant and stabilizer.

The tapes were aged for up to 35 days at 23° C. and 50% relative humidity (RH), as well as for 20 hours in a 90° C. water bath. Hot creep measurements were conducted after various time intervals at the two different curing conditions. The results are shown in Table 4 and Table 5 below. Surprisingly, when cured at 23° C. and 50% relative humidity, the formulations of the examples according to embodiments disclosed and described herein (Examples 4-7) crosslinked substantially faster than the comparative examples, such that the times to attain 80% hot creep were approximately 3 or 10 times shorter relative to Comparative Examples 4 and 5, respectively. Similarly, another formulation of an example according to embodiments disclosed and described herein (Example 8) crosslinked substantially faster than the comparative examples, such that the time to attain 80% hot creep was approximately 3 times shorter relative to Comparative Example 8. Furthermore, the formulations of the examples (Examples 4-7) exhibited substantially faster moisture-crosslinking than the formulations made with commercially available comparative ethylene-VTMS copolymers (used in Comparative Examples 6 and 7). Also unexpected was the finding that the use of scorch resistant additive (SRA) or moisture scavenger had much less of an adverse effect (if any) on the cure times of ethylene-VTMS copolymers according to embodiments (compare Example 4 with Example 7) than in the case of commercially available comparative ethylene-VTMS copolymers (Comparative Example 6 versus Comparative Example 7). In all cases, the ultimate degrees of crosslinking attained were similar or identical (as reflected in the hot creep values obtained after 20 hours cure in a 90° C. water bath).

Interestingly, all the inventive ethylene-VTMS copolymers (of about 1.5 wt % VTMS content, as measured by XRF) exhibited values of "Amorphous Content at Room Temperature×Polydispersity×LCB" that were substantially greater than those of the comparative ethylene-VTMS copolymers (Table 2).

Regression analyses of the data (using JMP software) on all compositions except Comparative Example 7 (on which copolymer characterization data were not available in Tables 2 and 3) revealed that there were very good correlations of "Days to 100% Hot Creep (200° C., 0.2 MPa) at 23° C., 50%

RH" or "Days to 80% Hot Creep (200° C., 0.2 MPa) at 23° C., 50% RH" with the following properties of the ethylene-VTMS copolymers: Polydispersity, Amorphous Content at Room Temperature, Density, "Density×Polydispersity" and/or "Amorphous Content at Room Temperature×Polydispersity". Furthermore, the variables of greatest statistical significance were Polydispersity, "Density×Polydispersity" and/or "Amorphous Content at Room Temperature×Polydispersity", as evident from the results of JMP analyses shown in Tables 6 to 7. Interestingly, Density and Amorphous Content at Room Temperature were not statistically significant variables (at 95% confidence). Note that the compositions were all made with the same type and amount of silanol condensation catalyst, using ethylene-VTMS copolymers of similar VTMS contents, and that the resulting tapes were generally of similar thickness values.

TABLE 4

|  | Ex. 4 | Ex. 5 | Ex. 6 | Ex. 7 | C. Ex. 4 | C. Ex. 5 | C. Ex. 6 | C. Ex. 7 |
|---|---|---|---|---|---|---|---|---|
| Formulation (wt %) | | | | | | | | |
| Ethylene-VTMS Copolymer Pellets of Ex. 1 | 92.0 | | | 91.5 | | | | |
| Ethylene-VTMS Copolymer Pellets of Ex. 2 | | 92.0 | | | | | | |
| Ethylene-VTMS Copolymer Pellets of Ex. 3 | | | 92.0 | | | | | |
| Ethylene-VTMS Copolymer Pellets of C. Ex. 1 | | | | | 92.0 | | | |
| Ethylene-VTMS Copolymer Pellets of C. Ex. 2 | | | | | | 92.0 | | |
| SI-LINK™ DFDA-5451 NT Pellets | | | | | | | 92.0 | |
| SI-LINK™ AC DFDB-5451 NT Pellets | | | | | | | | 92.0 |
| PROSILY 9202 Octyltriethoxysilane | | | | 0.5 | | | | |
| SI-LINK™ AC DFDB-5418 BK EXP1 Pellets (Silanol Condensation Catalyst Masterbatch) | 8.0 | 8.0 | 8.0 | 8.0 | 8.0 | 8.0 | 8.0 | 8.0 |
| Tape Thickness (mil) | 67 | 66 | 67 | 64 | 64 | 72 | 65 | 66 |
| Tape Thickness (mm) | 1.70 | 1.68 | 1.70 | 1.63 | 1.63 | 1.83 | 1.65 | 1.68 |
| Hot Creep (%) - 200° C., 0.2 MPa | | | | | | | | |
| After 3 days at 23° C., 50% RH | 201.18 | | | | | | | |
| After 4 days at 23° C., 50% RH | 123.11 | 163.74 | 162.57 | 215.49 | 222.22 | | 203.54 | |
| After 7 days at 23° C., 50% RH | 104.37 | 123.67 | 110.56 | 119.96 | 137.56 | 205.58 | 127.86 | 196.22 |
| After 10 days at 23° C., 50% RH | 89.54 | 85.46 | 85.94 | 95.77 | 120.58 | 178.83 | 109.87 | 124.34 |
| After 14 days at 23° C., 50% RH | 80.50 | 75.97 | 77.91 | 81.13 | 111.13 | 160.59 | 96.51 | 111.72 |
| After 21 days at 23° C., 50% RH | 69.82 | 65.91 | 70.07 | 69.02 | 92.10 | 143.43 | 85.28 | 98.04 |
| After 28 days at 23° C., 50% RH | 62.07 | 67.22 | 64.32 | 67.45 | 81.88 | 132.38 | 75.03 | 88.81 |
| After 35 days at 23° C., 50% RH | Not Available | 57.24 | Not Available | 65.28 | 80.88 | 130.72 | Not Available | 76.29 |
| After 20 hr in 90° C. Water Bath | 22.20 | 21.05 | 21.77 | 23.29 | 21.54 | 25.98 | 23.06 | 22.98 |
| Days to 100% Hot Creep (200° C., 0.2 MPa) at 23° C., 50% RH | 8 | 9 | 9 | 10 | 19 | ~80 * | 13 | 20 |
| Days to 80% Hot Creep (200° C., 0.2 MPa) at 23° C., 50% RH | 15 | 13 | 13 | 15 | ~35 | ~170 * | 25 | 33 |

* predicted by curve fitting and extrapolation of the data

TABLE 5

|  | Ex. 8 | C. Ex. 8 |
|---|---|---|
| Formulation (wt %) | | |
| Ethylene-VTMS Copolymer Pellets of Ex. 1 | 92.0 | |
| Ethylene-VTMS Copolymer Pellets of C. Ex. 3 | | 92.0 |
| SI-LINK™ AC DFDB-5418 BK EXP1 Pellets (Silanol Condensation Catalyst Masterbatch) | 8.0 | 8.0 |
| Tape Thickness (mil) | 61 | 58 |
| Tape Thickness (mm) | 1.55 | 1.47 |
| Hot Creep (%) - 200° C., 0.2 MPa | | |
| After 2 days at 23 C., 50% RH | 183.82 | |
| After 3 days at 23° C., 50% RH | 151.90 | |
| After 4 days at 23° C., 50% RH | 129.20 | 196.77 |
| After 7 days at 23° C., 50% RH | 92.24 | 155.93 |
| After 10 days at 23° C., 50% RH | 76.56 | 118.14 |
| After 14 days at 23° C., 50% RH | 66.48 | 107.99 |
| After 21 days at 23° C., 50% RH | 61.99 | 89.55 |
| After 28 days at 23° C., 50% RH | 53.04 | 70.70 |
| After 35 days at 23° C., 50% RH | 51.59 | 67.61 |
| After 20 hr in 90° C. Water Bath | 22.85 | 22.62 |
| Days to 100% Hot Creep (200° C., 0.2 MPa) at 23° C., 50% RH | 7 | 17 |
| Days to 80% Hot Creep (200° C., 0.2 MPa) at 23° C., 50% RH | 10 | 25 |

TABLE 6

Regression Analyses for ""Days to 100% Hot Creep (200° C., 0.2 MPa) at 23° C., 50% RH"

| | Coefficients | Prob > \|t\|: The p-value associated with a two-tailed test | Statistically Significant at 95% Confidence? |
|---|---|---|---|
| Empirical Model 1 ($R^2$ = 0.90) | | | |
| Intercept | 3136.90 | 0.2551 | NO |
| Polydispersity | −21.96 | 0.0279 | YES |
| Density | −3252.10 | 0.2688 | NO |
| (Density − 0.91839) × (Polydispersity − 6.60333) | −9701.67 | 0.0282 | YES |
| Empirical Model 2 ($R^2$ = 0.95) | | | |
| Intercept | 53.16 | 0.6945 | NO |
| Polydispersity | −11.77 | 0.1871 | NO |
| Amorphous Content at Room Temperature | −0.54 | 0.8686 | NO |
| (Amorphous Content at Room Temperature − 55.5178) × (Polydispersity − 6.6033) | 9.21 | 0.0035 | YES |

TABLE 7

Regression Analyses for ""Days to 80% Hot Creep (200° C., 0.2 MPa) at 23° C., 50% RH"

| | Coefficients | Prob > \|t\|: The p-value associated with a two-tailed test | Statistically Significant at 95% Confidence? |
|---|---|---|---|
| Empirical Model 3 ($R^2$ = 0.93) | | | |
| Intercept | 7195.56 | 0.1723 | NO |
| Polydispersity | −49.03 | 0.0140 | YES |
| Density | −7477.23 | 0.1833 | NO |
| (Density − 0.91839) × (Polydispersity − 6.60333) | −21939.94 | 0.0135 | YES |
| Empirical Model 4 ($R^2$ = 0.97) | | | |
| Intercept | 73.75 | 0.7461 | NO |
| Polydispersity | −28.04 | 0.0834 | NO |
| Amorphous Content at Room Temperature | 2.10 | 0.7027 | NO |
| (Amorphous Content at Room Temperature − 55.5178) × (Polydispersity − 6.6033) | 20.51 | 0.0010 | YES |

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

The invention claimed is:

1. A copolymer of ethylene and hydrolysable silane, wherein the copolymer comprises one or both of from 0.1 wt % to 5.0 wt % hydrolysable silane groups and from 0.02 mol % to 1.00 mol % hydrolysable silane groups and has the following properties:
   a Mz(abs)/Mw(abs) of less than or equal to 9.5;
   a ratio of Mz(abs)/Mw(abs) to polydispersity of less than or equal to 1.2;
   a polydispersity of 6.6 or greater;
   a LCB of 2.9 or greater;
   a Density×Polydispersity of 6.0 or greater;
   an Amorphous Content at Room Temperature×Polydispersity of 360 or greater; and
   an Amorphous Content at Room Temperature×Polydispersity×LCB of 1000 or greater.

2. The copolymer of claim 1, wherein the copolymer comprises one or both of from 0.9 wt % to 3.5 wt % hydrolysable silane groups and from 0.17 mol % to 0.68 mol % hydrolysable silane groups.

3. The copolymer of claim 1, wherein the copolymer has at least one of the following properties:
   a Mz(abs)/Mw(abs) of less than or equal to 9.0;
   a ratio of Mz(abs)/Mw(abs) to polydispersity of less than or equal to 1.4;
   a polydispersity of 6.7 or greater;
   a LCB of 3.0 or greater;
   a Density×Polydispersity of 6.1 or greater;
   an Amorphous Content at Room Temperature×Polydispersity of 370 or greater; or
   an Amorphous Content at Room Temperature×Polydispersity×LCB of 1100 or greater.

4. The copolymer of claim 1, wherein the copolymer has at least one of the following properties:
   a Mz(abs)/Mw(abs) of less than or equal to 8.5;
   a ratio of Mz(abs)/Mw(abs) to polydispersity of less than or equal to 1.3;
   a polydispersity of 7.0 or greater;
   a LCB of 3.1 or greater;
   a Density×Polydispersity of 6.5 or greater;
   an Amorphous Content at Room Temperature×Polydispersity of 400 or greater; or
   an Amorphous Content at Room Temperature×Polydispersity×LCB of 1200 or greater.

5. A moisture-crosslinkable polymeric composition comprising:
   the copolymer of claim 1; and
   a silanol condensation catalyst or catalyst masterbatch blend or silanol condensation catalyst masterbatch.

6. The moisture-crosslinkable polymeric composition of claim 5, wherein the moisture-crosslinkable polymeric composition has a hot creep, measured at 0.2 MPa and 150° C. or 200° C. on extruded tape with a thickness of 50 mil (1.270 mm) to 80 mil (2.032 mm), of less than or equal to 100% within 15 days or less than or equal to 80% within 23 days, where the tape made of the moisture-crosslinkable polymeric composition has been cured at 23° C. and 50% relative humidity.

7. The moisture-crosslinkable polymeric composition of claim 5, wherein the moisture-crosslinkable polymeric composition has a hot creep, measured at 0.2 MPa and 150° C. or 200° C. on extruded tape with a thickness of 30 mil (0.762 mm) to 80 mil (2.032 mm), of less than or equal to 175% after curing the tape for 4 hours to 20 hours in a 90° C. water bath.

8. The moisture-crosslinkable polymeric composition of claim 5, wherein the copolymer of ethylene and hydrolysable silane comprises from 10.00 wt % to 99.95 wt % of the moisture-crosslinkable polymeric composition, and the silanol condensation catalyst or catalyst masterbatch blend or silanol condensation catalyst masterbatch comprises from 90.0 wt % to 0.05 wt % of the moisture-crosslinkable polymeric composition.

9. The moisture-crosslinkable polymeric composition of claim 5, wherein the moisture-crosslinkable polymeric composition further comprises one or more of:

moisture scavengers or scorch retardants;
antioxidants;
flame retardants;
UV stabilizers and absorbers;
metal deactivator;
polyolefins without silane functionality; and
silicones.

10. A cable comprising:
a conductor; and
a insulation or jacket annularly encompassing the conductor, wherein the jacket comprises the moisture-crosslinkable polymeric composition of claim 5.

11. A method for forming a moisture-crosslinkable polymer composition comprising:

forming a copolymer of ethylene and hydrolysable silane at a polymerization temperature of greater than or equal to 180° ° C. to less than or equal to 400° C. at a pressure from 5,000 psi (34.5 MPa) to 50,000 psi (344.7 MPa); and adding a silanol condensation catalyst to the copolymer of ethylene and hydrolysable silane, wherein the moisture-crosslinkable polymeric composition has a hot creep, measured at 0.2 MPa and 150° ° C. or 200° C. on extruded tape with a thickness of 50 mil (1.270 mm) to 80 mil (2.032 mm), of less than or equal to 100% within 15 days or less than or equal to 80% within 23 days, where the tape made of the moisture-crosslinkable polymeric composition has been cured at 23° C. and 50% relative humidity.

12. The method of claim 11, wherein the copolymer of ethylene and hydrolysable silane is formed at a polymerization temperature of greater than or equal to 245° C. to less than or equal to 325° C.

13. The method of claim 11, wherein the moisture-crosslinkable polymeric composition has a hot creep, measured at 0.2 MPa and 150° C. or 200° C. on extruded tape with a thickness of 30 mil (0.762 mm) to 80 mil (2.032 mm), of less than or equal to 175% after curing the tape for 4 hours to 20 hours in a 90° C. water bath.

14. The method of claim 11, wherein the silanol condensation catalyst is added as a catalyst masterbatch blend or silanol condensation catalyst.

* * * * *